(12) United States Patent
Takakuwa et al.

(10) Patent No.: US 8,098,980 B2
(45) Date of Patent: Jan. 17, 2012

(54) INFORMATION RECORD MEDIUM, INFORMATION RECORD DEVICE AND METHOD, INFORMATION REPRODUCTION DEVICE AND METHOD, INFORMATION RECORD/REPRODUCTION DEVICE AND METHOD, RECORDING OR REPRODUCTION CONTROL, COMPUTER PROGRAM AND DATA STRUCTURE INCLUDING A CONTROL SIGNAL

(75) Inventors: Nobuyuki Takakuwa, Saitama (JP); Takeshi Koda, Saitama (JP); Tohru Kanegae, Saitama (JP); Masanori Nakahara, Saitama (JP); Takao Sawabe, Saitama (JP); Yasuko Fukuda, Saitama (JP); Akira Imamura, Saitama (JP)

(73) Assignee: Pioneer Corporation, Tokyo (JP)

( * ) Notice: Subject to any disclaimer, the term of this patent is extended or adjusted under 35 U.S.C. 154(b) by 1435 days.

(21) Appl. No.: 10/512,378

(22) PCT Filed: Apr. 24, 2003

(86) PCT No.: PCT/JP03/05292
§ 371 (c)(1), (2), (4) Date: Oct. 25, 2004

(87) PCT Pub. No.: WO03/092282
PCT Pub. Date: Nov. 6, 2003

(65) Prior Publication Data
US 2006/0044998 A1    Mar. 2, 2006

(30) Foreign Application Priority Data
Apr. 24, 2002  (JP) .................................. 2002-122867

(51) Int. Cl.
*H04N 5/84* (2006.01)
*H04N 5/89* (2006.01)

(52) U.S. Cl. ........................................ 386/332; 386/334
(58) Field of Classification Search ................... 386/46, 386/83, 95, 125, 126
See application file for complete search history.

(56) References Cited

U.S. PATENT DOCUMENTS

| | | | | |
|---|---|---|---|---|
| 5,745,645 | A * | 4/1998 | Nakamura et al. | 386/131 |
| 6,236,432 | B1 * | 5/2001 | Lee | 375/240.26 |
| 6,922,521 | B2 * | 7/2005 | Okada et al. | 386/83 |
| 7,280,566 | B2 * | 10/2007 | Okamoto et al. | 370/542 |
| 2002/0131761 | A1 * | 9/2002 | Kawasaki et al. | 386/65 |

FOREIGN PATENT DOCUMENTS

| | | |
|---|---|---|
| EP | 0 994 480 | 4/2000 |
| JP | 11-045512 | 2/1999 |
| JP | 2000-187963 | 7/2000 |
| JP | 2001-135024 | 5/2001 |

OTHER PUBLICATIONS

European Patent Office issued an European Search Report dated Sep. 4, 2009, Application No. 03 71 7724. "Chapter 6: Application Details: DVD-Video and DVD-Audio Ed-Taylor J" DVD Demystified (Second Edition), New York: McGraw-Hill, US, Jan. 1, 2001, pp. 249-333, XP009119357.

* cited by examiner

*Primary Examiner* — William C Vaughn, Jr.
*Assistant Examiner* — Gelek W Topgyal
(74) *Attorney, Agent, or Firm* — Young & Thompson

(57) ABSTRACT

On an information recode medium, a whole stream containing a plurality of partial streams each consisting of content information including still picture information is multiplexed and recorded on packet basis. The information record medium includes a file for storing object data consisting of a plurality of packets each containing a fragment of content information and a file for storing information defining the reproduction sequence of the object data. Furthermore, the information record medium includes an object information file for storing classification information indicating whether each object data corresponds to a first encoding method or a second encoding method.

10 Claims, 26 Drawing Sheets

BROADCASTING TIME ELAPSE

FIG. 17
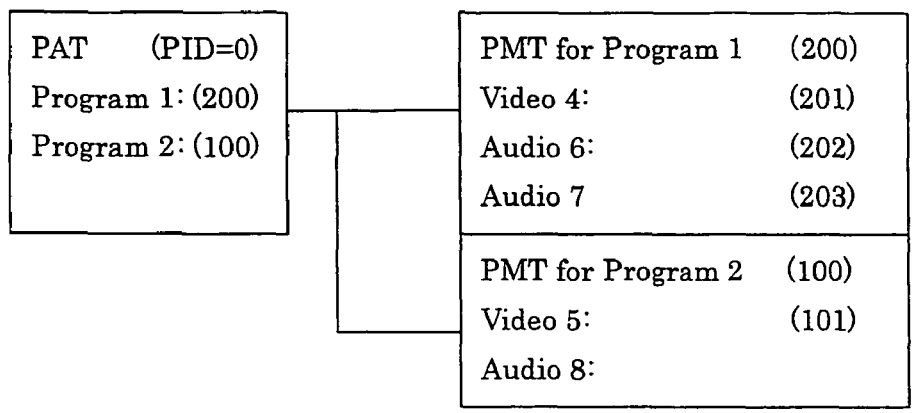
FIG. 18
| Program Map PID | Program No. | ES CONTENTS | ES_PID |
|---|---|---|---|
| 100 | 1 | Video 6 | 101 |
| | | Audio 9 | 102 |
| | | Audio 10 | 103 |
| | | Sub picture 1 | 104 |
| | | Sub picture 2 | 105 |
FIG. 19
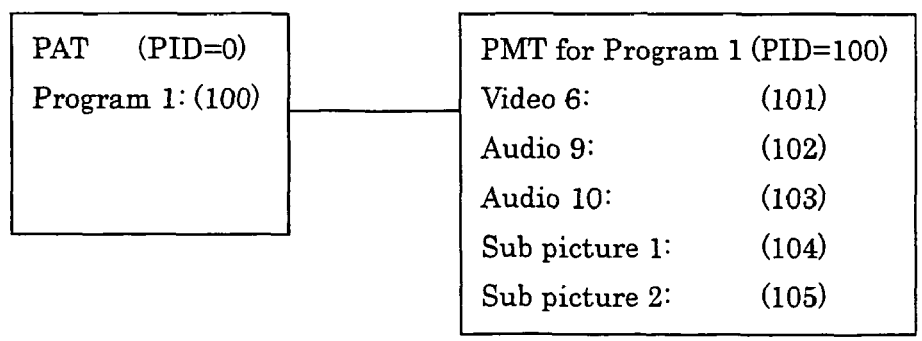

FIG. 20

| STREAM CONTENTS | STREAM ID | SUB STREAM ID |
|---|---|---|
| Video 7 | 1110 0000b | — |
| Audio 11 | 1100 0000b | — |
| Audio 12 | 1011 1101b | 1000 0010b |

FIG. 21

| STREAM CONTENTS | STREAM ID | SUB STREAM ID |
|---|---|---|
| Video 8 | 1110 0001b | — |
| Audio 13 | 1100 0001b | — |
| Audio 14 | 1011 1101b | 1000 1011b |

FIG. 22

| DISC | | | | | |
|---|---|---|---|---|---|
| TITLE #1 | | | TITLE #2 | | TITLE #3 |
| P LEST #1 | | | P LIST #2 | | P LIST #3 |
| Item #1 | | Item #2 | Item #3 | Item #1 | Item #1 |
| TS #1 OBJECT | | TS #2 OBJECT | #4 OBJECT | TS #3 OBJECT | #5 OBJECT |
| Vision #1 | Video 1 | Vision #1 | Video 4 | Video 7 | Video 6 | Video 8 |
| | Audio 2 | | Audio 7 | Audio 11 | Audio 9 | Audio 13 |
| Vision #2 | Video 2 | Vision #2 | Video 5 | Audio 12 | Audio 10 | Audio 14 |
| | Audio 3 | | Audio 8 | | Sub picture 1 | |
| | | | | | Sub picture 2 | |

FIG. 24

| FIELD NAME | | | CONTENTS |
|---|---|---|---|
| P LIST GENERAL INFO. | | | P LIST SIZE, TOTAL P LIST QUANTITY, etc. |
| P LIST POINTER TABLE | P LIST #1 POINTER | | P LIST #1 INFO. STORING ADDRESS |
| | P LIST #2 POINTER | | P LIST #2 INFO. STORING ADDRESS |
| | P LIST #3 POINTER | | P LIST #3 INFO. STORING ADDRESS |
| P LIST #1 INFO. TABLE | P LIST #1 GENERAL INFO. | | TOTAL QUANTITY OF ITEM CONSTITUTING P LIST #1=3, OTHER INFO. |
| | P LIST #1 ITEM INFO. TABLE | ITEM #1 INFO. | OBJECT INFO. NO. IN OBJECT INFO. FILE=1, AU NO. IN AU TABLE, etc. |
| | | ITEM #2 INFO. | OBJECT INFO. NO. IN OBJECT INFO. FILE=1, AU NO. IN AU TABLE, etc. |
| | | ITEM #3 INFO. | OBJECT INFO. NO. IN OBJECT INFO. FILE=2, AU NO. IN AU TABLE, etc. |
| | OTHER INFO. | | COMMAND CONTENTS, etc. |
| P LIST #2 INFO. TABLE | P LIST #2 GENERAL INFO. | | TOTAL QUANTITY OF ITEM CONSTITUTING P LIST #2=1, OTHER INFO. |
| | P LIST #2 ITEM INFO. TABLE | ITEM #1 INFO. | OBJECT INFO. NO. IN OBJECT INFO. FILE=1, AU NO. IN AU TABLE, etc. |
| | OTHER INFO. | | COMMAND CONTENTS, etc. |
| P LIST #3 INFO. TABLE | P LIST #3 GENERAL INFO. | | TOTAL QUANTITY OF ITEM CONSTITUTING P LIST #2=1, OTHER INFO. |
| | P LIST #3 ITEM INFO. TABLE | ITEM #1 INFO. | OBJECT INFO. NO. IN OBJECT INFO. FILE=2, AU NO. IN AU TABLE=2, etc. |
| | OTHER INFO. | | COMMAND CONTENTS, etc. |

FIG. 25

| FIELD NAME | | | | CONTENTS |
|---|---|---|---|---|
| OBJECT GENERAL INFO. | | | | QUANTITY OF OBJECT INFO., EACH OBJECT TYPE, POINTER TO EACH OBJECT INFO., etc. |
| AU TABLE GENERAL INFO. | | | | AU QUANTITY, POINTER TO EACH AU, etc. |
| | AU #1 | PU #1 | ES_Table Index #1 | INDEX NO. OF ES MAP TABLE=1 |
| | | | ES_Table Index #2 | 3 |
| | | PU #2 | ES_Table Index #1 | 4 |
| | | | ES_Table Index #2 | 5 |
| | AU #2 | PU #1 | ES_Table Index #1 | 9 |
| | | | ES_Table Index #2 | 10 |
| | | PU #2 | ES_Table Index #1 | 12 |
| | | | ES_Table Index #2 | 13 |
| | AU #3 | PU #1 | ES_Table Index #1 | 14 |
| | | | ES_Table Index #2 | 15 |
| | | | ES_Table Index #3 | 16 |
| | | | ES_Table Index #4 | 17 |
| | | | ES_Table Index #5 | 18 |
| PACKET NO. DISCRETE INFO. | | | | PACKET LENGTH, PACKET NO. DISCRETE START POINT, OFFSET VALUE, etc. |
| OTHER INFO. | | | | POSITION OF ES MAP TABLE #1 |
| AU TABLE GENERAL INFO. | | | | AU NO., POINTER TO EACH AU, etc. |
| | AU #1 | PU #1 | ES_Table Index #1 | 1 |
| | | | ES_Table Index #2 | 2 |
| | | | ES_Table Index #3 | 3 |
| | AU #2 | PU #1 | ES_Table Index #1 | 4 |
| | | | ES_Table Index #2 | 5 |
| | | | ES_Table Index #3 | 6 |
| PACKET NO. DISCRETE INFO. | | | | PACKET LENGTH, PACKET NO. DISCRETE START POINT, OFFSET VALUE, etc. |
| OTHER INFO. | | | | POSITION OF ES MAP TABLE #2 |
| OTHER INFO. | | | | |

| | FIELD NAME | CONTENTS |
|---|---|---|
| ES_Map Table #1 | ES MAP TABLE GENERAL INFO. | INDEX QUANTITY etc. |
| | Index #1 | ES PID VALUE=1 |
| | | ADDRESS INFO. |
| | Index #2 | ES_PID = 102 |
| | | ADDRESS INFO. |
| | Index #3 | ES_PID = 103 |
| | | ADDRESS INFO. |
| | Index #4 | ES_PID = 201 |
| | | ADDRESS INFO. |
| | Index #5 | ES_PID = 202 |
| | | ADDRESS INFO. |
| | Index #6 | ES_PID = 301 |
| | | ADDRESS INFO. |
| | Index #7 | ES_PID = 302 |
| | | ADDRESS INFO. |
| | Index #8 | ES_PID = 303 |
| | | ADDRESS INFO. |
| | Index #9 | ES_PID = 201 |
| | | ADDRESS INFO. |
| | Index #10 | ES_PID = 202 |
| | | ADDRESS INFO. |
| | Index #11 | ES_PID = 203 |
| | | ADDRESS INFO. |
| | Index #12 | ES_PID = 101 |
| | | ADDRESS INFO. |
| | Index #13 | ES_PID = 102 |
| | | ADDRESS INFO. |
| | Index #14 | ES_PID = 101 |
| | | ADDRESS INFO. |
| | Index #15 | ES_PID = 102 |
| | | ADDRESS INFO. |
| | Index #16 | ES_PID = 103 |
| | | ADDRESS INFO. |
| | Index #17 | ES_PID = 104 |
| | | ADDRESS INFO. |
| | Index #18 | ES_PID = 105 |
| | | ADDRESS INFO. |
| | OTHER INFO. | |

| FIELD NAME | | CONTENTS |
|---|---|---|
| ES_Map Table #2 | ES MAP TABLE GENERAL INFO. | INDEX QUANTITY, POINTER TO EACH ACCESS UNIT ADDRESS INFO., etc. |
| | Index #1 | STREAM ID VALUE=1110 0000b |
| | | SUB STREAM ID=0 |
| | | ACCESS UNIT ADDRESS INFO.=1, etc. |
| | Index #2 | STREAM ID VALUE=1100 0000b |
| | | SUB STREAM ID=0 |
| | | ACCESS UNIT ADDRESS INFO.=1, etc. |
| | Index #3 | STREAM ID VALUE=1011 1101b |
| | | SUB STREAM ID=1000 0010b |
| | | ACCESS UNIT ADDRESS INFO.=1, etc. |
| | Index #4 | STREAM ID VALUE=1110 0001b |
| | | SUB STREAM ID=0 |
| | | ACCESS UNIT ADDRESS INFO.=2, etc. |
| | Index #5 | STREAM ID VALUE=1100 0001b |
| | | SUB STREAM ID=0 |
| | | ACCESS UNIT ADDRESS INFO.=2, etc. |
| | Index #6 | STREAM ID VALUE=1011 1101b |
| | | SUB STREAM ID=1000 1011b |
| | | ACCESS UNIT ADDRESS INFO.=2, etc. |
| | ADDRESS INFO. | ACCESS UNIT ADDRESS INFO.#1 |
| | | ACCESS UNIT ADDRESS INFO.#2 |
| | | OTHER INFO. |
| | OTHER INFO. | |

| DATA CONTENTS |
|---|
| Picture 1 |
| Picture 2 |
| Picture 3 |

| DISC |||||||
|---|---|---|---|---|---|---|
| TITLE #1 |||| TITLE #2 || TITLE #3 |
| P LIST #1 |||| P LIST #2 || P LIST #3 |
| Item #1 || Item #2 || Item #3 | Item #1 | Item #2 | Item #1 |
| TS #1 OBJECT || TS #2 OBJECT || #4 OBJECT | TS #3 OBJECT | #6 OBJECT | #5 OBJECT |
| Vision #1 | Video 1 | Vision #1 | Video 4 | Video 7 | Video 6 | Picture 1 | Video 8 |
| | Audio 2 | | Audio 7 | Audio 11 | Audio 9 | Picture 2 | Audio 13 |
| Vision #2 | Video 2 | Vision #2 | Video 5 | Audio 12 | Audio 10 | Picture 3 | Audio 14 |
| | Audio 3 | | Audio 8 | | Sub picture 1 | | |
| | | | | | Sub picture 2 | | |

FIG. 30

| FIELD NAME | | | CONTENTS |
|---|---|---|---|
| P LIST GENERAL INFO. | | | P LIST SIZE, TOTAL QUANTITY OF P LIST, etc. |
| P LIST POINTER TABLE | P LIST #1 POINTER | | P LIST #1 INFO. STORING ADDRESS |
| | P LIST #2 POINTER | | P LIST #2 INFO. STORING ADDRESS |
| | P LIST #3 POINTER | | P LIST #3 INFO. STORING ADDRESS |
| P LIST #1 INFO. TABLE | P LIST #1 GENERAL INFO. | | TOTAL QUANTITY OF ITEM CONSTITUTING P LIST #1=2, OTHER INFO. |
| | P LIST #1 ITEM INFO. TABLE | ITEM #1 INFO. | OBJECT INFO. NO. IN OBJECT INFO. FILE=1, AU NO. IN AU TABLE, etc. |
| | | ITEM #2 INFO. | OBJECT INFO. NO. IN OBJECT INFO. FILE=1, AU NO. IN AU TABLE, etc. |
| | | ITEM #3 INFO. | OBJECT INFO. NO. IN OBJECT INFO. FILE=2, AU NO. IN AU TABLE, etc. |
| | OTHER INFO. | | COMMAND CONTENTS, etc. |
| P LIST #2 INFO. TABLE | P LIST #2 GENERAL INFO. | | TOTAL QUANTITY OF ITEM CONSTITUTING P LIST #2=1, OTHER INFO. |
| | P LIST #2 ITEM INFO. TABLE | ITEM #1 INFO. | OBJECT INFO. NO. IN OBJECT INFO. FILE=1, AU NO. IN AU TABLE, etc. |
| | | ITEM #2 INFO. | OBJECT INFO. NO. IN OBJECT INFO. FILE=3, AU NO. IN AU TABLE, STILL PICTURE DISPLAY TIME INFO. etc. |
| | OTHER INFO. | | COMMAND CONTENTS, etc. |
| P LIST #3 INFO. TABLE | P LIST #3 GENERAL INFO. | | TOTAL QUANTITY OF ITEM CONSTITUTING P LIST #2=1, OTHER INFO. |
| | P LIST #3 ITEM INFO. TABLE | ITEM #1 INFO. | OBJECT INFO. NO. IN OBJECT INFO. FILE=2, AU NO. IN AU TABLE=2, etc. |
| | OTHER INFO. | | COMMAND CONTENTS, etc. |

FIG. 31

| | FIELD NAME | | | CONTENTS | |
|---|---|---|---|---|---|
| 133-1 | OBJECT GENERAL INFO. | | | OBJECT NO. INFO., EACH OBJECT TYPE, POINTER TO EACH OBJECT INFO., etc. | 601 |
| 133-2 | OBJECT INFO. #1 | AU TABLE GENERAL INFO. | | | AU NO., POINTER TO EACH AU, etc. | |
| | | AU Table | AU #1  1381 | PU #1 | ES_Table Index #1 | INDEX NO. OF ES MAP TABLE=1 |
| | | | | | ES_Table Index #2 | 3 |
| | | | | PU #2 | ES_Table Index #1 | 4 |
| | | | | | ES_Table Index #2 | 5 |
| | | | AU #2 | PU #1 | ES_Table Index #1 | 9 |
| | | | | | ES_Table Index #2 | 11 |
| | | | | PU #2 | ES_Table Index #1 | 12 |
| | | | | | ES_Table Index #2 | 13 |
| | | | AU #3  3021 | PU #1 | ES_Table Index #1 | 14 |
| | | | | | ES_Table Index #2 | 15 |
| | | | | | ES_Table Index #3 | 16 |
| | | | | | ES_Table Index #4 | 17 |
| | | | | | ES_Table Index #5 | 18 |
| | | PACKET NO. DISCRETE INFO. | | | PACKET LENGTH, PACKET NO. DISCRETE START POINT, OFFSET VALUE, etc. |
| | | OTHER INFO. | | | POSITION OF ES MAP TABLE #1 | 602 |
| 133-2 | OBJECT INFO. #2 | AU TABLE GENERAL INFO. | | | AU QUANTITY, POINTER TO EACH AU, etc. |
| | | AU Table | AU #1 | PU #1 | ES_Table Index #1 | 1 |
| | | | | | ES_Table Index #2 | 2 |
| | | | | | ES_Table Index #3 | 3 |
| | | | AU #2 | PU #1 | ES_Table Index #1 | 4 |
| | | | | | ES_Table Index #2 | 5 |
| | | | | | ES_Table Index #3 | 6 |
| | | PACKET NO. DISCRETE INFO. | | | PACKET LENGTH, PACKET NO. DISCRETE START POINT, OFFSET VALUE, etc. |
| | | OTHER INFO. | | | POSITION OF ES MAP TABLE #2 |
| 133-3 | OBJECT INFO. #3 | AU TABLE GENERAL INFO. | | | AU QUANTITY, POINTER TO EACH AU, etc. |
| | | AU Table | AU #1 | PU #1 | ES_Table Index #1 | 1 |
| | | | | | ES_Table Index #2 | 2 |
| | | | | | ES_Table Index #3 | 3 |
| | | PACKET NO. DISCRETE INFO. | | | PACKET LENGTH, PACKET NO. DISCRETE START POINT, OFFSET VALUE, etc. |
| | | OTHER INFO. | | | POSITION OF ES MAP TABLE #3 |
| | OTHER INFO. | | | | |

FIG. 32

| FIELD NAME | | CONTENTS |
|---|---|---|
| ES_Map Table #3 | ES MAP TABLE GENERAL INFO. | INDEX QUANTITY, etc. |
| | Index #1 | ADDRESS INFO. DATA LENGTH, DATA FORMAT, etc. |
| | Index #2 | ADDRESS INFO. DATA LENGTH, DATA FORMAT, etc. |
| | Index #3 | ADDRESS INFO. DATA LENGTH, DATA FORMAT, etc. |
| | OTHER INFO. | |

134-3

INFORMATION RECORD MEDIUM, INFORMATION RECORD DEVICE AND METHOD, INFORMATION REPRODUCTION DEVICE AND METHOD, INFORMATION RECORD/REPRODUCTION DEVICE AND METHOD, RECORDING OR REPRODUCTION CONTROL, COMPUTER PROGRAM AND DATA STRUCTURE INCLUDING A CONTROL SIGNAL

TECHNICAL FIELD

The present invention relates to an information record medium, such as a high density optical disc, capable of recording various information such as main picture, audio, sub picture, reproduction control information, and so on, at high density, relates to an information record apparatus for and method of recording the information onto the information record medium, relates to an information reproduction apparatus for and method of reproducing the information from the information record medium, relates to an information record/reproduction apparatus for and method capable of both recording and reproducing the information, relates to a computer program product for record or reproduction control, and relates to a data structure including control signal for the reproduction control.

BACKGROUND ART

DVDs become common as optical discs onto which various information such as main picture (video), audio, sub picture, reproduction control information and so on is recorded. According to a DVD standard, main picture information (video data), audio information (audio data) and sub picture information (sub picture data) are respectively packetized with the reproduction control information (navigation data) and multi-recorded onto a disc in a program stream format of MPEG 2(Moving Picture Experts Group phase 2), which is a high performance encoding technology. Among them, the main picture information has data, which is compressed in a MPEG video format (ISO 13818-2), for one stream in one program stream. On the other hand, the audio information is recorded in a plurality of formats (i.e. linear PCM, AC-3, MPEG audio and so on) and has data for up to 8 streams in one program stream. The sub picture information is defined by a bitmap, and is compressed and recorded in a run length method, and has data for up to 32 streams in one program stream. Thus, in DVDs, by employing the program stream format, a plurality of selectable streams of the audio information (e.g. stereo audio stream or surround audio stream, original English audio stream, Japanese dubbing audio stream, and so on) and a plurality of selectable streams of the sub picture information (e.g. Japanese caption stream, English caption stream and so on) are multi-recorded for one stream of the main picture information in one movie for example.

On the other hand, recently, a transport stream of MPEG2 standard is coming to be standardized, which is suitable for larger volume or higher speed data transfer. According to the transport stream format, a plurality of elementary streams are transferred at the same time at a far higher transfer rate than the aforementioned program streams format. For example, a plurality of programs, such as a plurality of satellite digital broadcasting channels in one satellite radio wave, are transmitted at the same time in a TDM (Time Division Multiplex) scheme. That is, in the transport stream format, a plurality of elementary streams each having a large amount of data can be multiplexed in the TDM scheme and transferred, for example, a plurality of movies to be recorded in a plurality of DVDs can be transferred at the same time.

DISCLOSURE OF INVENTION

However, the aforementioned program stream is generally suitable for the data recording. A basic reproduction operation of the program stream is made of firstly taking in various logical information and reproduction control information and then reproducing contents information on the basis of the taken-in information. On the contrary, the aforementioned transport stream format is generally suitable for the data transfer. A basic reproduction operation of the transport stream is made of taking in various logical information and reproduction control information almost at the same time of taking in contents information and reproducing the contents information on the basis of the taken-in information. For this, if an optical disc stores programs therein recorded in both formats, it is technically difficult to quickly extract only a series of packets disposed discretely and constructing a stream relating to a desired program, and to perform the reproduction on the basis of them without delay. It is technically difficult also to perform the recording allowing such a reproduction. Particularly, it is very difficult to, during the reproduction, switch to another program to be reproduced recorded in a program stream format or transport stream format the same as or different from a program under the reproduction at present and perform the reproduction on the basis of this.

The present invention has been accomplished in view of the above problems. It is therefore an object of the present invention to provide an information record medium, an information record apparatus and method, an information reproduction apparatus and method, and an information record/reproduction apparatus and method, capable of multi-recording a plurality of programs in a plurality of encoding format different from each other, such as a transport stream format and a program stream format, and capable of selecting and reproducing a desired program regardless of its encoding format, during the reproduction, and further capable of switching quickly the plurality of programs thereamong.

The above object of the present invention is achieved by an information record medium onto which a whole stream including a plurality of partial streams each comprising video information or audio information, constructing a series of contents, is multi-recorded by a unit of packet that is a physically accessible unit, said information record medium comprising: an object data file for storing object data comprising a plurality of packets each storing a piece of the video information or the audio information and each being a logically accessible unit; a reproduction sequence file for storing reproduction sequence information defining a reproduction sequence of the object data; and an object information file for storing, as reproduction control information to control a reproduction of the object data file, correspondence definition information for defining a relationship between the plurality of packets and the plurality of partial streams, wherein the whole stream includes a part packetized in a first encoding format and another part packetized in a second encoding format, and the object information file further stores, as the reproduction control information, classification information for indicating whether the object data is a first object data conforming to the first encoding format or a second object data conforming to the second encoding format and association group definition information for defining, as an association group, a set having a specific relationship from among a series of contents constructing the plurality of partial streams.

According to the information record medium, a whole stream includes a plurality of partial streams. For example, in a certain range thereof, the whole stream may bundle a plurality of partial streams to be recorded or reproduced at the same time on a reproduction time axis of the transport stream. Alternatively, in another range thereof for example, the whole stream may bundle a plurality of partial streams to be recorded or reproduced at the same time on a reproduction time axis of the program stream. Each of these partial streams consists of video information (e.g. video data or sub picture data) or audio information (e.g. audio data), which forms a series of contents reproducible by the information reproduction apparatus. Such a whole stream is multi-recorded onto the information record medium, by a unit of packet that is a unit physically accessible by the information reproduction apparatus.

Here, the object data file stores object data consisting of a plurality of packets each being a unit logically accessible by the information reproduction apparatus and each storing a piece of contents information. The "packet" means an information unit such as a PS (Program Stream) pack, a TS (Transport Stream) packet and so on, whose data length may be fixed at about 192 bytes such as the TS packet. Alternatively, it may be fixed at about 2048 bytes such as the PS pack or may be variable.

Reproduction sequence information stores reproduction sequence information (e.g. playlist information) to define a reproduction sequence of the object data stored in the object data file.

On the other hand, the object information file stores, as the reproduction control information, the correspondence definition information to define correspondence relationships between a plurality of packets and a plurality of partial streams. The correspondence definition information may include stream IDs as mentioned below or an ES map table or the like as mentioned below including the stream IDs for each partial stream, if the partial stream conforms to a MPEG program stream. Or, the correspondence definition information may includes an ES PID (Elementary Stream Packet ID) as mentioned below or an ES map table or the like as mentioned below including the ES PIDs for each partial stream, if the partial stream conforms to a MPEG transport stream.

Particularly in the present invention, the whole stream is divided into two parts, i.e. a part packetized on the basis of the first encoding format (i.e. the MPEG transport stream), and another part packetized on the basis of the second encoding format (i.e. the MPEG program stream). For example, a certain range on the reproduction time axis is defined as the transport stream and the another range is defined as the program stream, and these two kinds of stream are connected to each other at a certain time point on the reproduction time axis. Alternatively, these two kinds of stream may be independently recorded on different reproduction time axes having no relationship between them. In any case, two kinds of stream are recorded onto the information record medium such as one optical disc.

The object information file further stores classification information (e.g. object type information as mentioned below) to indicate which encoding format of these two kinds the object data conforms to.

Incidentally, various information to be stored in the reproduction sequence information file and the object information file is not multiplexed by a unit of packet on the information record medium, different from the object data file. Therefore, it is possible to reproduce the object data by the information reproduction apparatus, on the basis of these reproduction sequence information and the reproduction control information (i.e. the correspondence definition information, the classification information and so on).

In the information reproduction apparatus for reproducing the information record medium, the object information file is firstly referred in order to reproduce a desired program. Here, on the basis of the correspondence definition information, packets on the partial stream constructing the desired program to be reproduced are identified. Immediately before or after this, on the classification information, it is identified whether the identified packet(s) is/are based on the first encoding format or the second encoding format.

Next, the access is made to the identified packet(s) in the object data file so that the reproduction of a plurality of packets, usually disposed discretely, corresponding to the desired program to be reproduced is performed consecutively or continuously. In this case, the reproduction is performed in a reproduction sequence according to the reproduction sequence information, and in a decoding format corresponding to the first or second encoding format identified on the basis of the classification information.

As the result, according to the information record medium of the present invention, a relatively complicated recording for multi-recording the whole stream including parts encoded in two kinds of encoding format, as well as reproduction thereof, can be performed by a relatively simple process.

Additionally, the association group definition information identifies a set having a specific relationship from among a series of contents (a plurality of contents). The set having a specific relationship may be a set of partial streams of one main picture (motion picture) and partial streams of the corresponding audio and/or sub picture (caption or still picture). Alternatively, the set may be a set of partial streams relating to a pair of the video or audio switchable to each other, during the reproduction such as the dual broadcasting or the multi-view or multi-vision broadcasting, or during the reproduction such as the bilingual broadcasting.

During the reproduction, a set of contents information (i.e. a plurality of partial stream) relating to the desired program to be reproduced is identified, on the basis of the association group definition information. Furthermore, packets corresponding to a plurality of partial streams constructing the desired program to be reproduced are identified, on the basis of the correspondence definition information. As the result, a relatively complicated recording for multi-recording the dual broadcasting or the multi-view or multi-vision broadcasting or the like as a plurality of streams, as well as reproduction thereof, can be performed by a relatively simple process.

In an aspect of the information record medium of the present invention, the part of the whole stream packetized in the first encoding format is a MPEG transport stream (TS), and the another part of the whole stream packetized in the second encoding format is a MPEG program stream (PS).

According to this aspect, a relatively complicated recording for multi-recording the whole stream including a part encoded in the MPEG transport stream and another part encoded in the MPEG program stream, as well as reproduction thereof, can be performed by a relatively simple process.

In another aspect of the information record medium of the present invention, the object information file stores the correspondence definition information, the correspondence definition information being divided into a table including a part relating to the first object data of the correspondence definition information and a table including a part relating to the second object data of the correspondence definition information.

According to this aspect, in the case of reproducing the first object data conforming to the first encoding format on the basis of the classification information during the reproduction, a table including a part relating to the first object data of the correspondence definition information is referred. On the other hand, in the case of reproducing the second object data conforming to the second encoding format, a table including a part relating to the second object data of the correspondence definition information is referred. In any case, therefore, referring to the table allows the quick reproduction operation.

Incidentally, such a table may store the total object quantity existing in the object data file, or may store each object data classification information.

In another aspect of the information record medium of the present invention, the object information file further stores, as the reproduction control information, sub group definition information for defining, as a sub group, a set of partial streams switchable to each other during a reproduction in the association group.

According to this aspect, the object information file stores the sub group definition information (e.g. PU information as mentioned below), as one of the reproduction control information to control the reproduction of the object data file. Therefore, freely switchable partial streams in the association groups having a special relationship such as the multi-vision broadcasting, the multi-view broadcasting, the bilingual broadcasting and/or the bilingual captioned broadcasting can be identified easily at the information reproduction apparatus side, on the basis of the sub group (e.g. the PU as mentioned below) of a plurality of partial streams switchable to each other by the information reproduction apparatus in the association group described in the sub group definition information.

In another aspect of the information record medium of the present invention, the correspondence definition information includes packet identification information for indicating a relationship between a plurality of packets to be multiplexed at the same time point and the plurality of partial streams, for each partial stream, as for the first object data.

According to this aspect, during the reproduction, as for the first object data that may conform to the transport stream (TS), packets corresponding to each partial stream can be identified for each reproduction time point, on the basis of the packet ID number (e.g. the ES PID as mentioned below or the ES map table including the ES PID for each elementary stream).

Incidentally in this case, the object information file may further store address information of a predetermined kind of packet on each partial stream. For example, it may include address information of head packet (e.g. a serial number of the packet and the reproduction start time point) of I picture. If the address information is obtained with the aforementioned packet ID number, the desired packet can be accessed quickly in the object data file, on the basis of them. Incidentally, although the address information may be a physical address, it is typically a logical address. The actual physical address is defined uniquely from the logical address under the management of the file system.

In another aspect of the information record medium of the present invention, the correspondence definition information includes stream identification information for identifying at least a part of the plurality of packets corresponding to each of the plurality of partial streams, for each partial stream, as for the second object data.

According to this aspect, during the reproduction, as for the second object data that may conform to the program stream (PS), packets corresponding to each partial stream can be identified, on the basis of the stream identification information (e.g. the stream ID or sub stream ID as mentioned below, or the ES map table including these IDs for each elementary stream).

Incidentally in this case, the object information file may further store address information to indicate a record position of the access unit that may conform to the MPEG program stream. In this case, the quantity of packet constructing the access unit may be fixed or may be variable. Alternatively, packets corresponding to a certain time length (e.g. 0.5 seconds, 1 second, 2 seconds, 5 seconds, 10 seconds and so on) on the reproduction time axis may be united as an access unit. Here, the "address information" may indicate the access unit head (start) address of the access unit in the program stream by the packet number (e.g. a serial number in the object file) and the reproduction start time point). If the address information is obtained with the aforementioned stream ID information, the desired packet can be accessed quickly in the object data file, on the basis of them. Incidentally, although the address information may be a physical address, it is typically a logical address. The actual physical address is defined uniquely from the logical address, under the management of the file system.

In another aspect of the information record medium of the present invention, the object data file stores still picture information as at least a part of the video information, the object information file further stores address information for indicating a record position of the still picture information, data length information for indicating a data length of the still picture information, and data format information for indicating a data format of the still picture information as for the still picture information.

According to this aspect, the object data may include video information indicating a still picture of JPEG format or bitmap format, in addition to video information indicating a motion picture. During the reproduction, referring to the object information file makes it possible to reproduce the still picture from the still picture information, on the basis of the data format information indicating a data format (i.e. JPEG format, bitmap format and so on) of the still picture information, the data length information indicating a data length of the still picture information, and the address information indicating the record position of the still picture information. The still picture may be reproduced with the motion picture and the audio, or may be reproduced solely.

The above object of the present invention is achieved by an information record apparatus for multi-recording a whole stream including a plurality of partial streams each comprising video information or audio information constructing a series of contents by a unit of packet that is a physically accessible unit, onto an information record medium, said information record apparatus comprising: a first record device for recording an object data file for storing object data comprising a plurality of packets each storing a piece of the video information or the audio information and each being a logically accessible unit; a second record device for recording a reproduction sequence file for storing reproduction sequence information defining a reproduction sequence of the object data; and a third record device for recording an object information file for storing, as reproduction control information to control a reproduction of the object data file, correspondence definition information for defining a relationship between the plurality of packets and the plurality of partial streams, wherein the whole stream includes a part packetized in a first encoding format and another part packetized in a second encoding format, and the object information file further stores, as the reproduction control information, classification information for indicating whether the object data is a first object data conforming to the first encoding format or a second object data conforming to the second encoding format and association group definition information for defining, as an association group, a set having a specific relationship from among a series of contents constructing the plurality of partial streams.

According to the information record apparatus of the present invention, the first record device, such as a system controller, an encoder, the TS/PS object generator as mentioned below, an optical pickup and so on, records the object data file for storing the object data, the second record device, such as a system controller, an optical pickup and so on, records the reproduction sequence information file for storing the reproduction sequence information, and the third record device, such as a system controller, an optical pickup and so on, records the object information file for storing the correspondence definition information, the classification information and the association group definition information, as the reproduction control information. Therefore, a whole stream including parts encoded in two kinds of encoding format, such as the MPEG2 program stream and transport stream, can be multi-recorded onto the aforementioned information record medium of the present invention. And a relatively complicated recording for multi-recording the dual broadcasting or the multi-view or multi-vision broadcasting or the like as a plurality of streams can be performed by a relatively simple process.

In this case, the first record device multi-records the object data by a unit of packet, but the second and third devices do not multi-record the reproduction sequence information and the reproduction control information by a unit of packet.

Incidentally, the information record apparatus of the present invention can also take various aspects, corresponding to various aspects of the information record medium of the present invention mentioned above.

The above object of the present invention is achieved by an information record method of multi-recording a whole stream including a plurality of partial streams each comprising video information or audio information, constructing a series of contents by a unit of packet that is a physically accessible unit, onto an information record medium, said information record method comprising: a first record process of recording an object data file for storing object data comprising a plurality of packets each storing a piece of the video information or the audio information and each being a logically accessible unit; a second record process of recording a reproduction sequence file for storing reproduction sequence information defining a reproduction sequence of the object data; and a third record process of recording an object information file for storing, as reproduction control information to control a reproduction of the object data file, correspondence definition information for defining a relationship between the plurality of packets and the plurality of partial streams, wherein the whole stream includes a part packetized in a first encoding format and another part packetized in a second encoding format, and the object information file further stores, as the reproduction control information, classification information for indicating whether the object data is a first object data conforming to the first encoding format or a second object data conforming to the second encoding format and association group definition information for defining, as an association group, a set having a specific relationship from among a series of contents constructing the plurality of partial streams.

According to the information record method of the present invention, the object data file for storing the object data is recorded at the first record process, the reproduction sequence information file for storing the reproduction sequence information is recorded at the second record process, and the object information file for storing the correspondence definition information, the classification information and the association group definition information is recorded as the reproduction control information at the third record process. Therefore, a whole stream including parts encoded in two kinds of encoding format, such as the MPEG2 program stream and transport stream, can be multi-recorded onto the information record medium of the present invention mentioned above. And a relatively complicated recording for multi-recording the dual broadcasting or the multi-view or multi-vision broadcasting or the like as a plurality of streams can be performed by a relatively simple process.

Incidentally, the information record method can also take various aspects, corresponding to various aspects of the information record medium of the present invention mentioned above.

The above object of the present invention is achieved by an information reproduction apparatus for reproducing a part of the recorded whole stream from the aforementioned information record medium of the present invention (including its various aspects), said information reproduction apparatus comprising: a read device for physically reading information from the information record medium; and a reproduction device for reproducing the object data included in the information read by the read device, on the basis of the reproduction control information and the reproduction sequence information included in the information read by the read device.

According to the information reproduction apparatus of the present invention, the read device, such as an optical pickup, a decoder and so on, reads the information physically by a unit of the packet from the information record medium. Then, the reproduction device, such as a system controller, a demultiplexer, a decoder and so on, reproduces the object data particularly read by a unit of packet, on the basis of the reproduction control information and the reproduction sequence information included in the read information. Therefore, the whole stream including parts encoded in two kinds of encoding stream, such as the MPEG2 program stream and transport stream, can be reproduced from the aforementioned information record medium of the present invention. And the reproduction of the dual broadcasting or the multi-view or multi-vision broadcasting or the like multi-recorded as a plurality of streams can be performed by a relatively simple process.

Incidentally, the information reproduction apparatus of the present invention can also take various aspects, corresponding to various aspects of the information record medium of the present invention mentioned above.

In an aspect of the information reproduction apparatus of the present invention, the reproduction device switches a reproduction processing on the basis of the classification information so that a decoder conforming to the first encoding format performs decoding the data when the first object data is reproduced, and a decoder conforming to the second encoding format performs decoding the data when the second object data is reproduced.

According to this aspect, when the first object data is reproduced, according to the classification information, the reproduction device performs the decoding with the decoder conforming to the first encoding format. On the other hand, when the second object data is reproduced, according to the classification information, the reproduction device performs the decoding with the decoder conforming to the second encoding format. This switching the decoding process may be achieved by the shift switch. Alternatively, the switching may be achieved by using the same decoder and switching the data to be extracted.

In another aspect of the information reproduction apparatus of the present invention, the object data file stores still picture information, as at least a part of the video information, and the reproduction device switches a reproduction processing so that a decoder conforming to the still picture information performs decoding the data when the still picture information is reproduced.

According to this aspect, the reproduction device decodes the first or second object data according to the classification information. In the case of reproducing the still picture information in JPEG format, bitmap format and the like, the reproduction device further changes the decoder conforming to the data format.

The above object of the present invention is achieved by an information reproduction method of reproducing a part of the recorded whole stream from the aforementioned information record medium of the present invention (including its various aspects), said information reproduction method comprising: a read process of physically reading information from the information record medium; and a reproduction process of reproducing the object data included in the information read at the read process, on the basis of the reproduction control information and the reproduction sequence information included in the information read at the read process.

According to the information reproduction method of the present invention, the information is physically read by a unit of packet from the information record medium at the read process. Then, the object data particularly read by a unit of packet is reproduced at the reproduction process, on the basis of the reproduction control information and the reproduction sequence information included in the read information. Therefore, the whole stream including parts encoded in two kinds of encoding format, such as the MPEG2 program stream and transport stream, can be reproduced from the information record medium of the present invention mentioned above. And the reproduction of the dual broadcasting or the multi-view or multi-vision broadcasting or the like multi-recorded as a plurality of streams can be performed by a relatively simple process.

The above object of the present invention is achieved by an information record and reproduction apparatus for recording the whole stream onto the aforementioned information record medium of the present invention (including its various aspects) and reproducing a part of the recorded whole stream, said information record and reproduction apparatus comprising: a first record device for recording the object data file; a second record device for recording the reproduction sequence information file; a third record device for recording the object information file; a read device for physically reading information from the information record medium; and a reproduction device for reproducing the object data included in the information read by the read device, on the basis of the reproduction control information and the reproduction sequence information included in the information read by the read device.

According to the information record and reproduction apparatus of the present invention, similarly to the information record apparatus of the present invention mentioned above, the first record device multi-records the object data file by a unit of packet, the second record device records the reproduction sequence information file, and the third record device records the object information file. Then, similarly to the information reproduction apparatus of the present invention, the read device reads physically the information from the information record medium, and the reproduction device reproduces the object data particularly read by a unit of packet, on the basis of the reproduction control information and the reproduction sequence information included in the read information. Therefore, a whole stream including parts encoded in two kinds of encoding format can be multi-recorded onto the information record medium of the present invention, and the multi-recorded information can be appropriately reproduced. And a relatively complicated recording for multi-recording the dual broadcasting or the multi-view or multi-vision broadcasting or the like as a plurality of streams, as well as reproduction thereof, can be performed by a relatively simple process.

Incidentally, the information record and reproduction apparatus can also take various aspects, corresponding to various aspects of the information record medium of the present invention mentioned above.

The above object of the present invention is achieved by an information record and reproduction method of recording the whole stream onto the aforementioned information record medium of the present invention (including its various aspects) and reproducing a part of the recorded whole stream, said information record and reproduction method comprising: a first record process of recording the object data file; a second record process of recording the reproduction sequence information file; a third record process of recording the object information file; a read process of physically reading information from the information record medium; and a reproduction process of reproducing the object data included in the information read at the read process, on the basis of the reproduction control information and the reproduction sequence information included in the information read at the read process.

According to the information record and reproduction method of the present invention, similarly to the information record method of the present invention mentioned above, the object data file is multi-recorded at the first record process, the reproduction sequence information file is recorded at the second record process, and the object information file is recorded at the third record process. Then, similarly to the information reproduction method of the present invention mentioned above, the information is physically read from the information record medium at the read process, and the object data particularly read by a unit of a packet is reproduced at the reproduction process, on the basis of the reproduction control information and the reproduction sequence information included in the read information. Therefore, a whole stream including parts encoded in two kinds of encoding format can be multi-recorded onto the information record medium of the present invention mentioned above, and the multi-recorded information can be appropriately reproduced. And a relatively complicated recording for multi-recording the dual broadcasting or the multi-view or multi-vision broadcasting or the like as a plurality of streams, as well as reproduction thereof, can be performed by a relatively simple process.

Incidentally, the information record and reproduction method can also take various aspects, corresponding to various aspects of the information record medium of the present invention mentioned above.

The above object of the present invention is achieved by a computer program for a record control to control a computer disposed at the aforementioned information record apparatus of the present invention (including its various aspects), said computer program makes the computer function as at least a part of the first record device, the second record device and the third record device.

According to the computer program for the record control of the present invention, the information record apparatus of the present invention mentioned above can be embodied relatively easily, by reading and running the computer program from a record medium, such as a ROM, a CD-ROM, a DVD-ROM, a hard disk and so on, storing the computer program therein/thereon, or by downloading the computer program product to the computer via the communication device and running it.

The above object of the present invention is achieved by a computer program for a reproduction control to control a computer disposed at the aforementioned information reproduction apparatus of the present invention (including its various aspects), said computer program makes the computer function as at least a part of the reproduction device.

According to the computer program for the reproduction control of the present invention, the information reproduction apparatus of the present invention mentioned above can be embodied relatively easily, by reading and running the computer program from a record medium, such as a ROM, a CD-ROM, a DVD-ROM, a hard disk and so on, storing the computer program therein/thereon, or by downloading the computer program product to the computer via the communication device and running it.

The above object of the present invention is achieved by a computer program for a record and reproduction control to control a computer disposed at the aforementioned information record and reproduction apparatus of the present invention (including its various aspects), said computer program makes the computer function as at least a part of the first record device, the second record device, the third record device and the reproduction device.

According to the computer program for the record and reproduction control of the present invention, the information record and reproduction apparatus of the present invention mentioned above can be embodied relatively easily, by reading and running the computer program from a record medium, such as a ROM, a CD-ROM, a DVD-ROM, a hard disk and so on, storing the computer program therein/thereon, or by downloading the computer program product to the computer via the communication device and running it.

The above object of the present invention is achieved by a data structure including a control signal, in which a whole stream including a plurality of partial streams each comprising video information or audio information, constructing a series of contents, is multi-recorded by a unit of packet that is a physically accessible unit, said structure comprising: an object data file for storing object data comprising a plurality of packets each storing a piece of the video information or the audio information and each being a logically accessible unit; a reproduction sequence file for storing reproduction sequence information defining a reproduction sequence of the object data; and an object information file for storing, as reproduction control information to control a reproduction of the object data file, correspondence definition information for defining a relationship between the plurality of packets and the plurality of partial streams, wherein the whole stream includes a part packetized in a first encoding format and another part packetized in a second encoding format, and the object information file further stores, as the reproduction control information, classification information for indicating whether the object data is a first object data conforming to the first encoding format or a second object data conforming to the second encoding format and association group definition information for defining, as an association group, a set having a specific relationship from among a series of contents constructing the plurality of partial streams.

According to the data structure including the control signal of the present invention, similarly to the information record medium of the present invention mentioned above, a relatively complicated recording for multi-recording the whole stream including parts encoded in two kinds of encoding format, as well as the reproduction thereof, can be performed by a relatively simple process. And a relatively complicated recording for multi-recording the dual broadcasting or the multi-view or multi-vision broadcasting or the like as a plurality of streams, as well as reproduction thereof, can be performed by a relatively simple process.

The above object of the present invention is achieved by the first program storage device, readable by a computer disposed at the information record apparatus, for tangibly embodying a computer program capable of making the computer perform the information record method of the present invention mentioned above.

The above object of the present invention is achieved by the second program storage device, readable by a computer disposed at the information reproduction apparatus, for tangibly embodying a computer program capable of making the computer perform the information record method of the present invention mentioned above.

The above object of the present invention is achieved by the third program storage device, readable by a computer disposed at the information record and reproduction apparatus, for tangibly embodying a computer program capable of making the computer perform the information record method of the present invention mentioned above.

According to the first, second and third program storage device of the present invention, the information record method, the information reproduction method, or the information record and reproduction method may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it.

The above object of the present invention is achieved by a computer data signal embodied in a first carrier wave, for giving a series of instructions to make a computer disposed at the information record apparatus perform the information record method.

The above object of the present invention is achieved by a computer data signal embodied in a second carrier wave, for giving a series of instructions to make a computer disposed at the information reproduction apparatus perform the information reproduction method.

The above object of the present invention is achieved by a computer data signal embodied in a third carrier wave, for giving a series of instructions to make a computer disposed at the information record and reproduction apparatus perform the information record and reproduction method.

According to the computer data signal embodied in the first, second and third carrier wave, the information record method, the information reproduction method or the information record and reproduction method of the present invention can be performed relatively easily by downloading and running the computer program in the computer data signal via the computer network or the like.

The aforementioned effects and other advantages of the present invention will be more apparent from the following explanation.

BRIEF DESCRIPTION OF DRAWINGS

FIG. 17 is a schematic diagram of the data structure of PAT and PMT of the TS object #2, in a specific example of the embodiment.

FIG. 18 is a schematic diagram of the data structure of the TS object #3, in a specific example of the embodiment.

FIG. 19 is a schematic diagram of the data structure of PAT and PMT of the TS object #3, in a specific example of the embodiment.

FIG. 20 is a schematic diagram of the data structure of the PS object #4, in a specific example of the embodiment.

FIG. 21 is a schematic diagram of the data structure of the PS object #5, in a specific example of the embodiment.

FIG. 22 is a schematic diagram of the data structure finally constructed on the optical disc, in a specific example of the embodiment.

FIG. 24 is a schematic diagram illustrating a specific example of the data structure of the playlist information table, in a specific example in the embodiment.

FIG. 25 is a schematic diagram illustrating a specific example of the data structure of the object information table constructed in the object information file, in a specific example in the embodiment.

FIG. 26 is a schematic diagram illustrating a specific example of the data structure of the ES map table for TS constructed in the object information file, in a specific example in the embodiment.

FIG. 27 is a schematic diagram illustrating a specific example of the data structure of the ES map table for PS constructed in the object information file, in a specific example in the embodiment.

FIG. 28 is a schematic diagram illustrating the data structure of the still object data, in another specific example in the embodiment.

FIG. 29 is a schematic diagram illustrating the data structure finally constructed on the optical disc, in another specific example in the embodiment.

FIG. 30 is a schematic diagram illustrating a specific example of the data structure of the playlist information table, in another specific example in the embodiment.

FIG. 31 is a schematic diagram illustrating a specific example of the data structure of the object information table constructed in the object information file, in another specific example in the embodiment.

FIG. 32 is a schematic diagram illustrating a specific example of the data structure of the ES map table for still picture constructed in the object information file, in another specific example in the embodiment.

BEST MODE FOR CARRYING OUT THE INVENTION (Information Record Medium)

The information record medium of the present invention will be discussed, with reference to its embodiments, as well as FIG. 1 to FIG. 7. In these embodiments, the information record medium of the present invention is applied to an optical disc capable of recording (writing) and reproducing (reading).

Figure 1:
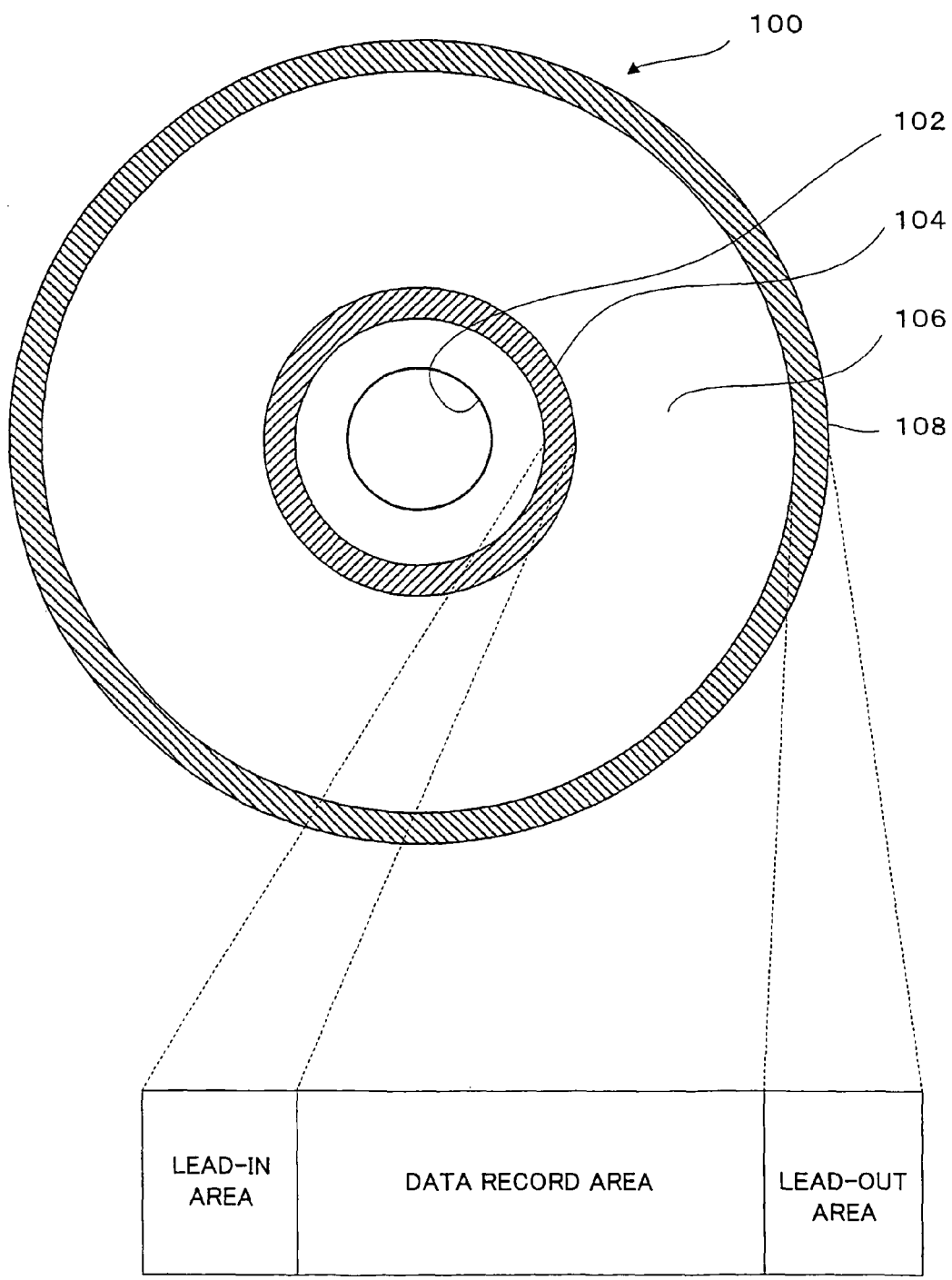
FIG. 1 illustrates, in its upper part, a general plan view of an optical disc as an embodiment of the information record medium of the present invention; and illustrates, in its lower part, a schematic conceptual diagram of an area structure in a radius direction corresponding to the general plan view in the upper part.

Firstly, with reference to FIG. 1, a fundamental structure of the optical disc in an embodiment will be discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as magneto-optical method, phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately formed, concentrically or spirally around the center hole 102. The groove tracks may be wobbled. Furthermore, pre-pits may be formed on one or both tracks. Incidentally, the present invention is not exclusively limited to the optical disc having three areas mentioned above.

Figure 2:
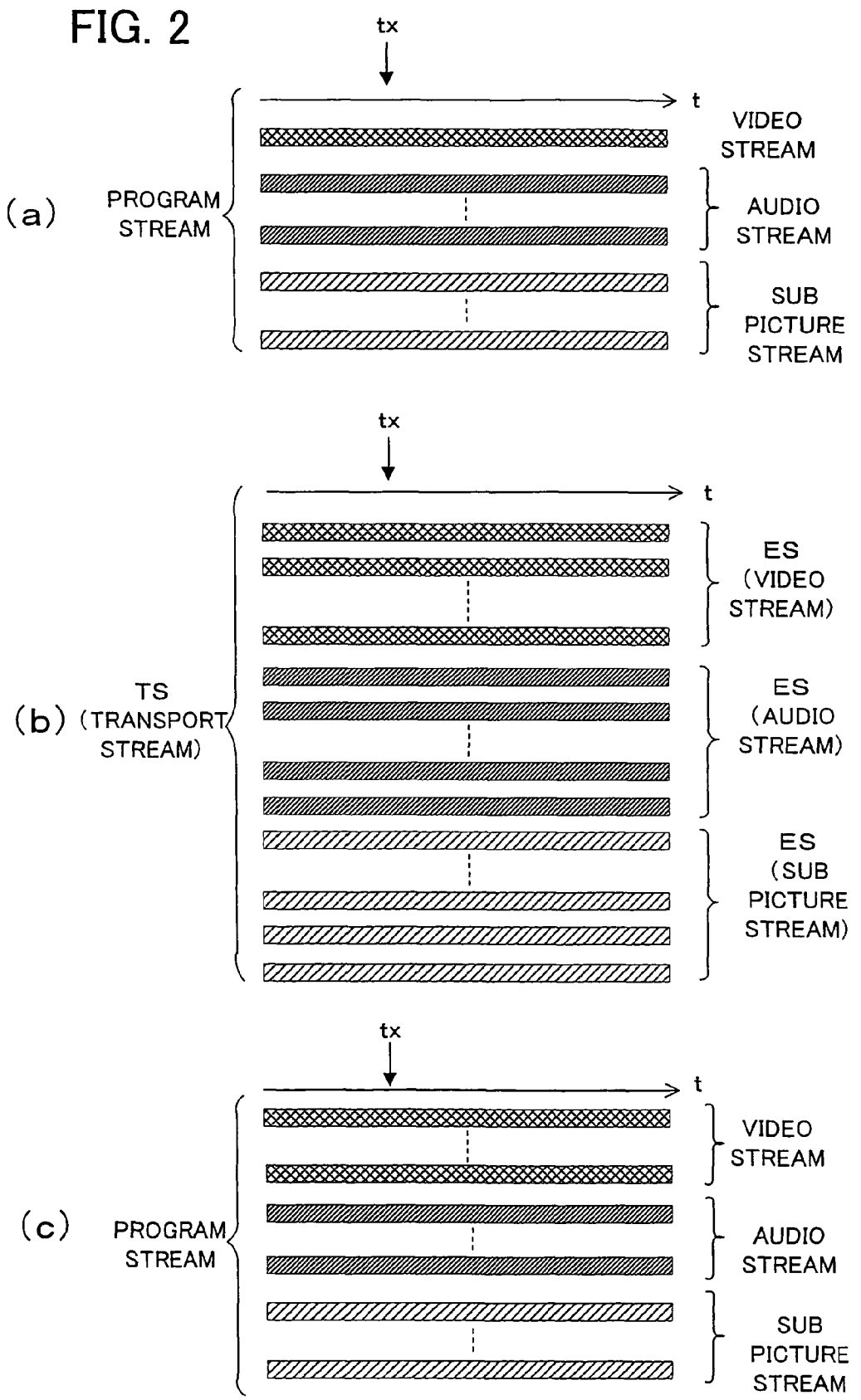
FIG. 2 illustrates a schematic conceptual diagram (FIG. 2(a)) of a conventional program stream of MPEG2; and a schematic conceptual diagram (FIG. 2(b)) of a transport stream of MPEG2 used in the embodiment.

Next, with reference to FIG. 2, the structures of the transport stream (TS) and the program stream (PS) to be recorded onto the optical disc in the embodiment will be discussed. FIG. 2(a) schematically illustrates a MPEG2 program stream of a conventional DVD for a comparison, FIG. 2(b) schematically illustrates a MPEG2 transport stream (TS) structure. Furthermore, FIG. 2(c) schematically illustrates a MPEG2 program stream structure in the present invention.

In FIG. 2(a), one program stream to be recorded in the conventional DVD includes only one video stream for vide data as main picture information, along the time axis t, and further includes up to 8 audio streams of audio data as audio information, up to 32 sub picture streams for sub picture data as sub picture information. That is, the video data to be multiplexed at an arbitrary time point tx relates to only one video stream. For example, a plurality of video stream corresponding to a plurality of TV programs or a plurality of movies can not be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2(b), one transport stream (TS) to be recorded in the optical disc 100 of the present invention includes a plurality of video streams as elementary streams (ES) for video data as main picture information, and further includes a plurality of audio streams as elementary streams (ES) for audio data as audio information and a plurality of sub picture streams as elementary streams (ES) for sub picture as sub picture information. That is, the video data to be multiplexed at an arbitrary time point tx relates to a plurality of video streams. For example, a plurality of video streams that may corresponds to a plurality of TV programs or a plurality of movies can be included at the same time in the transport stream. Thus, it is possible to multiplex a plurality of TV programs and transfer or record them, in the transport stream format having a plurality of video streams. However, the sub picture stream is not transferred in a digital broadcasting employing the existing transport stream.

In FIG. 2(c), one program stream (PS) to be recorded onto the optical disc 100 of the present invention includes a plurality of video streams for video data as main picture information, and further includes a plurality of audio streams for audio data as audio information and a plurality of sub picture streams for sub picture data as sub picture information. That is, the video data to be multiplexed at an arbitrary time point tx relates to a plurality of video streams. For example, a plurality of video streams that may corresponds to a plurality of TV programs or a plurality of movies can be included at the same time in the program stream.

Incidentally, for convenience of explanation, the video stream, the audio stream and the sub picture stream are arranged in this order from the top in FIG. 2(a) to FIG. 2(c). Nevertheless, this order does not correspond to an order for multiplexing packet by packet as mentioned below. In the transport stream, conceptually, a set of one video stream, two audio streams and two sub picture streams corresponds to one program for example.

The optical disc 100 in the aforementioned embodiment is adapted to multi-record the transport stream (TS) as shown in FIG. 2(b), i.e. to record a plurality of programs at the same time. Furthermore, instead of or in addition to this transport stream, the program stream (PS) as shown in FIG. 2(c) can be multi-recorded onto the same optical disc 100.

Figure 3:
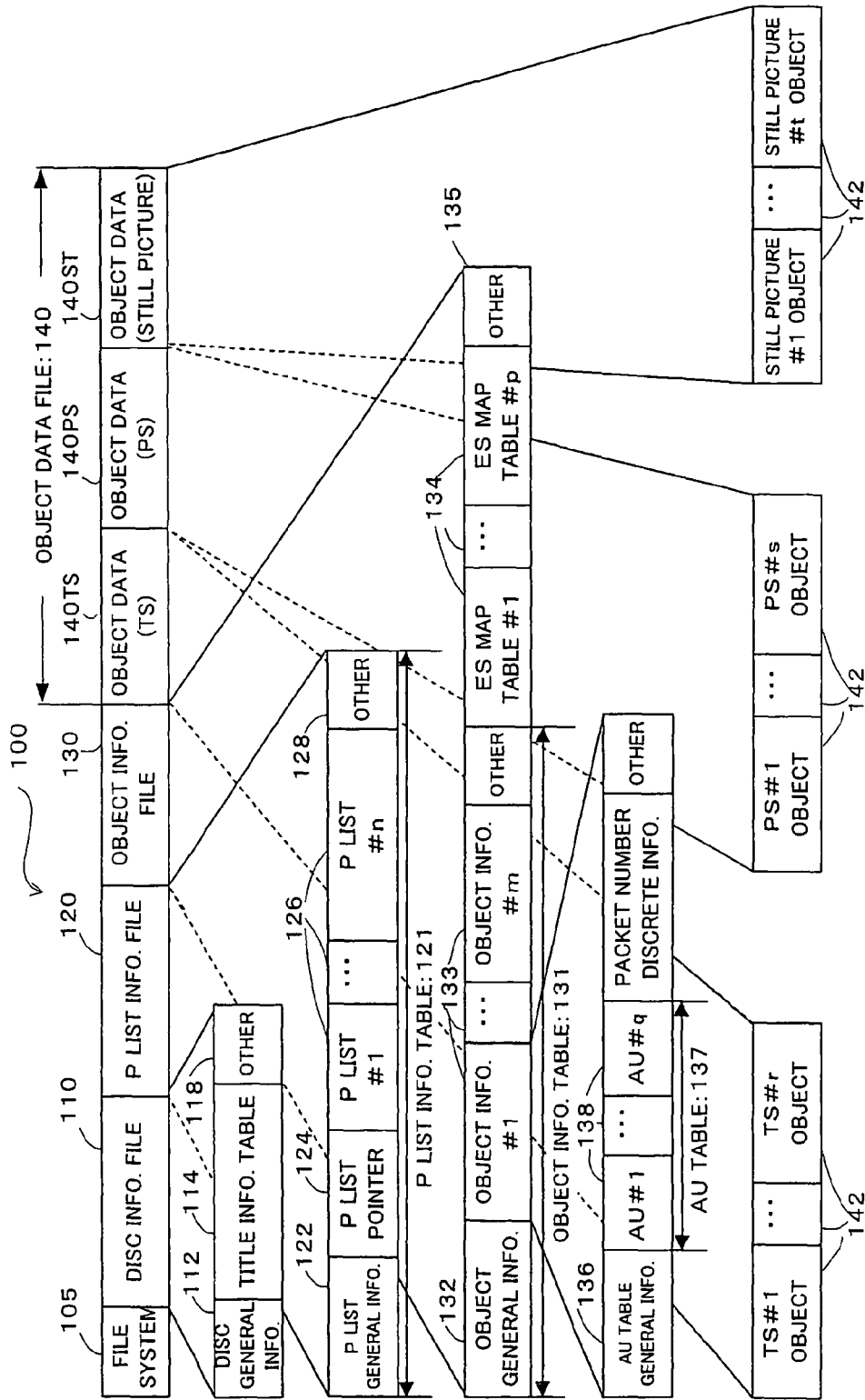
FIG. 3 is a schematic diagram illustrating a data structure recorded onto the optical disc in the embodiment.
Figure 4:
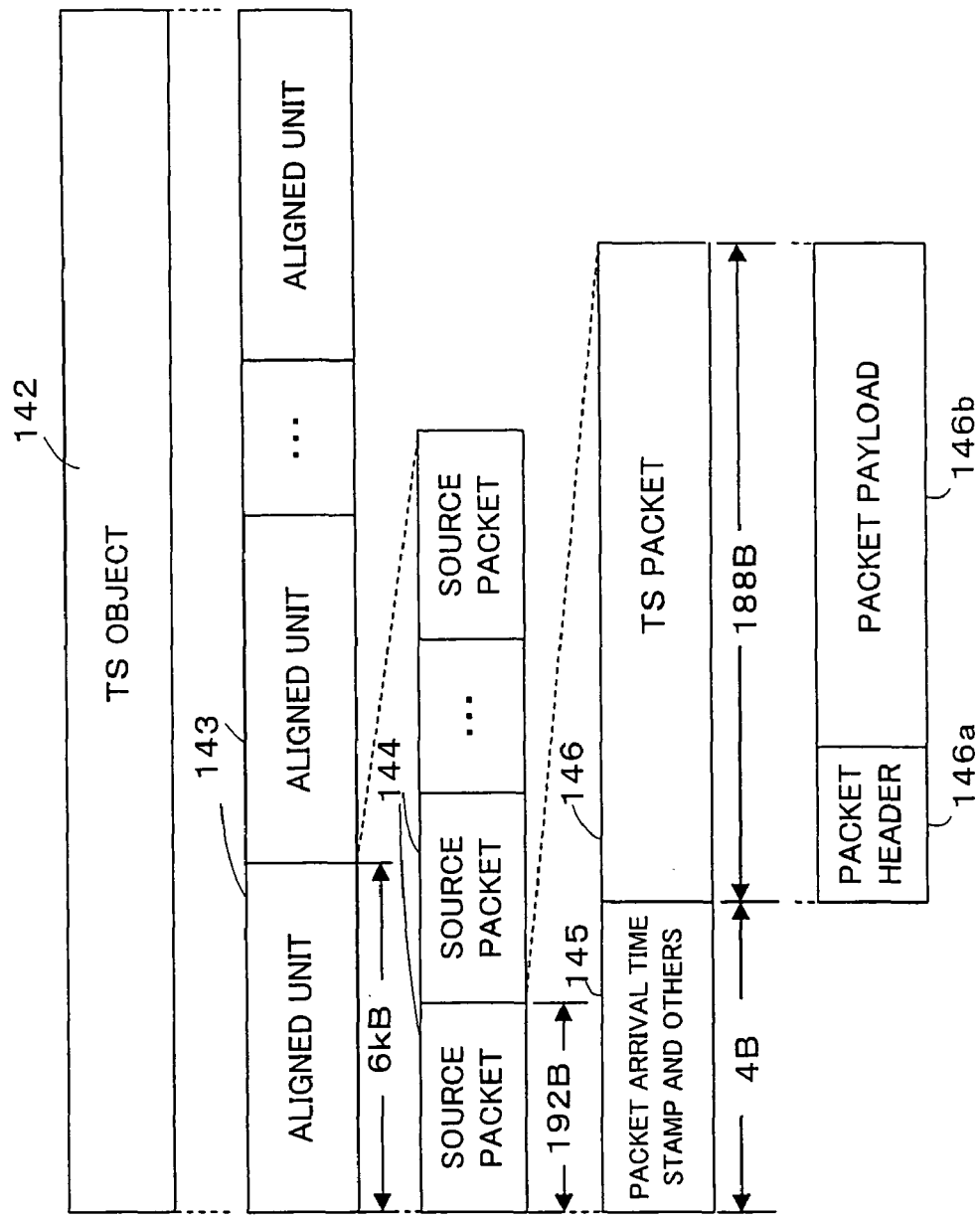
FIG. 4 is a schematic diagram illustrating a data structure in each object shown in FIG. 3.

Next, with reference to FIG. 3 and FIG. 4, a structure of data to be recorded onto the optical disc 100 will be discussed. FIG. 3 schematically illustrates the data structure to be recorded onto the optical disc 100. FIG. 4 schematically illustrates in detail the data structure in each object shown in FIG. 3.

In the following explanation, the "title" means a reproduction unit for consecutively or continuously executing a plurality of "playlists" and a unit having a logically large group such as one movie or one TV program. The "playlist" is a file for storing the information required to reproduce the "object" and consists of a plurality of "items" each storing the information relating to a reproduction range of the object to access the object. More specifically, "in point information" indicating the start address of the object and "out point information" indicating the end address are recorded in each item. Incidentally, these "in point information" and "out point information" may indicate directly the address respectively or may indicate indirectly the address with the time or time point on the reproduction time axis. The "object" is the entity information of contents constructing the aforementioned MPEG2 transport stream.

In FIG. 3, the optical disc 100 is provided with four files as a logical structure: a disc information file 110; a playlist (P list) information file 120; an object information file 130; and an object data file 140. The disc 100 is further provided with a file system 105 for managing these files. Incidentally, although FIG. 3 does not show directly the physical data arrangement on the optical disc 100, it is possible to perform the record so that the arrangement shown in FIG. 3 corresponds to another arrangement shown in FIG. 1, i.e. to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total quantity of titles in the optical disc 100. The title information table 114 stores, as the logical information, each title type (e.g. sequential reproduction type, branch type and so on), or the playlist (P list) number constructing each title, for each title.

The playlist information file 120 is a reproduction sequence information file, for storing the playlist (P list) information table 121 indicating the logical structure of each playlist. The playlist information file 120 is divided into the playlist (P list) general information 122, the playlist (P list) pointer 124, a plurality of playlists (P lists) 126 (P list #1-#n), and other information 128. In this playlist information table 121, the logical information of each playlist 126 is stored in the order of the playlist number. In other words, the order for storing the each playlist 126 is the playlist numbers. Furthermore, in the aforementioned title information table 114, the same playlist 126 can be referred from a plurality of titles. That is, the playlist #p in the playlist information table 121 may be pointed on the title information table 114, even in the case that title #n and title #m use the same playlist #p.

In the object information file 130, the storing position of the object data file 140 relative to each item constructed in each playlist 126 (i.e. the logical address of the reproduction object), and/or various attribution information relating to the reproduction of the item are stored. Particularly in this embodiment, the object information file 130 stores the object information table 131 including a plurality of object information 133 (object information #1-#m) as mentioned below, the ES (Elementary Stream) map table 134 and other information 135. Furthermore, the object information 133 stores the AU table 137 including a plurality of AU (Associated Unit) information 138I(AU#1-AU#q) as mentioned below.

The object data file 140 conforms to the MPEG2 transport stream (TS) standard, and has the object data 140TS for storing a plurality of TS object 142 for each transport stream (TS object #1-TS #s object), i.e. entity data of contents to be actually reproduced. Furthermore, in addition to or instead of this, it has the object data 140PS for storing the "PS object" conforming with the MPEG2 program stream (PS) standard and the object data 140ST for storing the "still picture object (still picture data)" made of the still picture data of JPEG format, bitmap format and so on.

Also the object information 133 and the ES map table 134 in the aforementioned object information file 130 are sorted respectively for TS, PS and still picture, corresponding to that the object data file 140 is sorted for the TS, PS and still picture. The detail of these data structures will be discussed later with the specific example (FIGS. 25-27, FIGS. 31 and 32).

The object data file 140 may have all three object data 140TS, 140PS and 140ST, or may have arbitrary two or only one from among them. Furthermore, each object data does not need to be arranged consecutively or continuously in the object data file 140.

Incidentally, four kinds of file discussed with reference to FIG. 3 (i.e. the disc information file 110, the P list information file 120, the object information file 130 and the object data file 140) can be further divided into a plurality of files respectively to be stored. All these files may be managed by the file system 105. For example, the object data file 140 can be divided into a plurality of files such as object data file #1, object data file #2, etc.

As shown in FIG. 4, the TS object 142 constructing the object data 140TS shown in FIG. 3 and being a unit logically reproducible may be divided into a plurality of aligned units 143 each having 6 kB of data amount. The head of the aligned units 143 corresponds to the head of the TS object 142 (aligned). Each aligned unit 143 is further divided into a plurality of source packets 144 each having 192 B of data amount. The source packet 144 is a physically reproducible unit, on the basis of which (i.e. by a unit of the packet) at least the video data, the audio data ant the sub picture data from among the data on the optical disc 100 are multiplexed, and other information may be multiplexed in the same manner. Each source packet 144 includes the control information 145 to control the reproduction, for example a packet arrival time stamp or the like indicating the reproduction start time point of the TS (Transport Stream) packet having 4B of data amount on the reproduction time axis, and the TS packet 146 having 188B of data amount. The TS packet 146 has a packet header 146a at its head portion. At the packet pay load 146b, the video data may be packetized as the "video packet", the audio data may be packetized as the "audio packet", or the sub picture data may be packetized as the "sub picture packet", otherwise other data may be packetized.

On the other hand, from among the object data file 140 shown in FIG. 3, the PS object constructing the object data 140PS relating to the program stream and being a logically reproducible unit is divided into access units as an accessible information unit. Each access unit is made of an information unit referred to as "PS pack" that may have 2048 bytes of data length. The detail of the PS pack is the same as in a known DVD, such as a video pack, an audio pack, a sub picture pack and a navigation pack. Particularly in the embodiment, with regard to the PS object, the ES address information is recorded in the ES map table 134 by an access unit. During the reproduction, the access unit can be accessed, on the basis of the ES address information.

Preferably in this embodiment, the data length, 2048 bytes, of each packet in the PS object may be variable, and the packet length information indicating the packet data length of each PS object is recorded in the object information file 130 (see FIG. 25 and FIG. 31), as discussed below. Each packet record position is identified by referring to the packet length information during the reproduction.

Furthermore, from among the object data file 140 shown in FIG. 3, the still picture object constructing the object data 140ST relating to the still picture and being a logically reproducible unit is made of the object data such as known JPEG format, bitmap format.

Next, with reference to FIG. 5(a) and FIG. 6, the multi-recording of the video data, the audio data, the sub picture data and the like in the transport stream format as shown in FIG. 2(b) by the TS packet 146 shown in FIG. 4 will be discussed. FIG. 5(a) conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 6 conceptually illustrates an image of the TS packets multiplexed in one transport stream (TS), as a packet array along the time axis.

Figure 5:
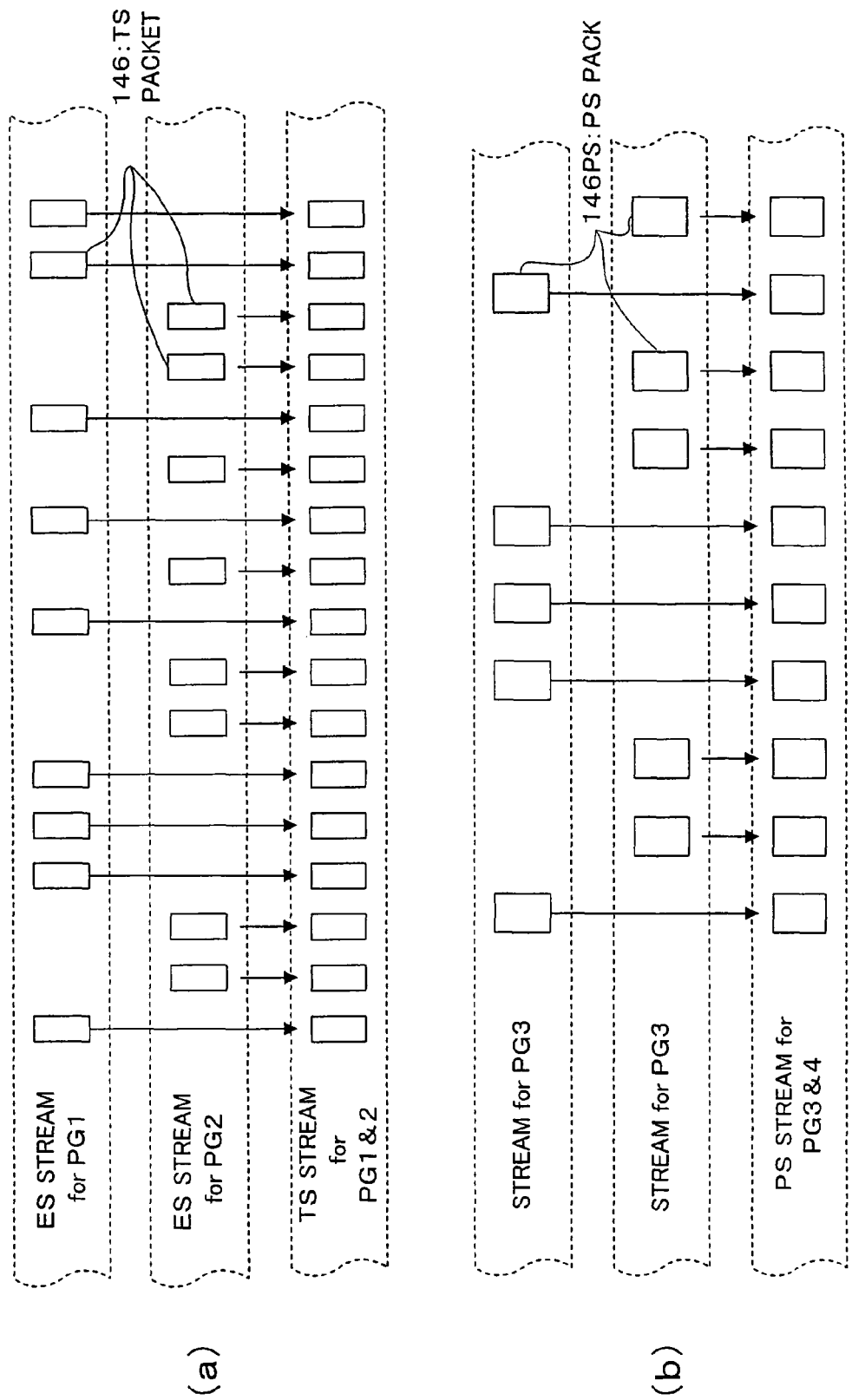
FIG. 5 is a conceptual diagram illustrating of multiplexing an elementary stream for the program #1 in the upper stage and an elementary stream for the program #2 in the middle stage, and forming a transport stream for the programs #1 and #2, under an assumption that the horizontal axis is a time axis.
Figure 6:
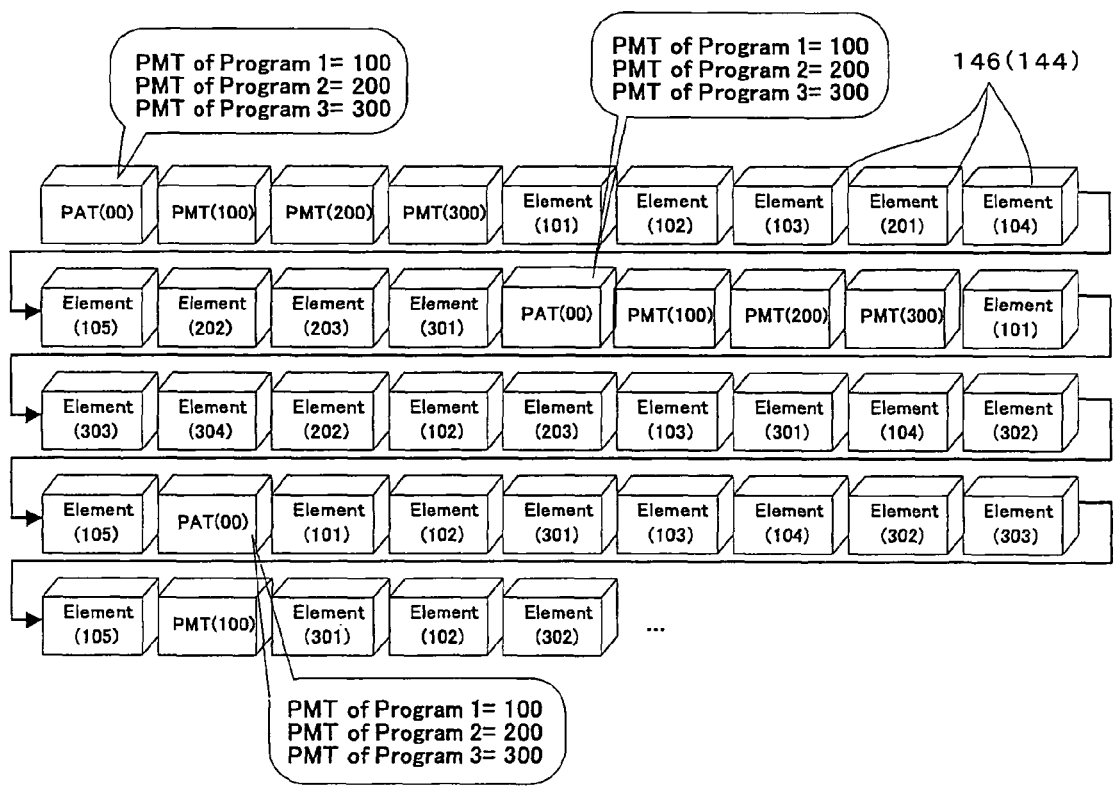
FIG. 6 is a conceptual diagram illustrating an image of the TS packet multiplexed in one transport stream in the embodiment, as a packet array along the time axis.

As shown in FIG. 5(a), the elementary stream for program #1 (in the upper stage) may be formed by discretely arranging TS packets 146 obtained by packetizing the video data for program #1, along to the time axis. The elementary stream for program #2 (in the middle stage) may be formed by discretely arranging TS packets 146 obtained by packetizing the video data for program #2, along to the time axis. Then, these TS packets 146 are multiplexed so that the transport stream (in the lower stage) for two programs is made. Incidentally, omitted for convenience of explanation in FIG. 5, the elementary stream made of TS packets obtained by packetizing the audio data and/or the sub picture stream made of TS packets obtained by packetizing the sub picture data may be multiplexed similarly as the elementary stream for program #1, as shown in FIG. 2(b). In addition to this, the elementary stream made of TS packets obtained by packetizing the audio data and the sub picture stream made of TS packets obtained by packetizing the sub picture data may be multiplexed similarly as the elementary stream for program #2.

As shown in FIG. 6, in this embodiment, a plurality of TS packets 146 multiplexed as such forms one TS stream. Then, the plurality of TS packets 146 in the multiplexed form is multi-recorded onto the optical disc 100, with the information such as the packet arrival time stamp 145 and the like being added. Incidentally, in FIG. 6, the TS packet 146 consisting of the data forming program #i (i=1, 2, 3) is indicated by "element (i0j)" under the assumption that j (j=1, 2, . . . ) is a number indicating an order for each stream forming the program. This (i0j) is defined as a packet ID which is an identification number of the TS packet 146 for each elementary stream. This packet ID is fixed at an inherent value for a plurality of TS packets 146 to be multiplexed a the same time point, so that the plurality of TS packets 146 is distinguished from each other even if they are multiplexed at the same time point.

Furthermore, in FIG. 6, PAT (Program Association Table) and PMT (Program Map Table) are also packetized by a unit of the TS packet 146 and multiplexed. The PAT among them stores a table indicating a plurality of the PMT packet ID. Particularly, the PAT is defined by MPEG2 standard so that (000) is given as a predetermined packet ID, as shown in FIG. 6. That is, from among a plurality of packets multiplexed at the same time, the TS packet 146 obtained by packetizing the PAT is detected, as the TS packet 146 whose packet ID is (000). The PMT stores a table indicating the packet ID for each elementary stream forming each program as for one or more programs. Any packet ID can be given to the PMT, their packet IDs are indicated by the PAT detectable based on the packet ID (000) as mentioned above. Therefore, among a plurality of packets multiplexed at the same time point, the TS packets 146 obtained by packetizing the PMT (i.e. TS packets 146 to which packet IDs (100), (200), (300) are given in FIG. 6) are detected on the basis of the PAT.

In the case that the transport stream as shown in FIG. 6 is transferred digitally, the tuner refers to the PAT and the PMT constructed as such and thereby extracts the multiplexed packets corresponding to the desired elementary stream and decodes the extracted packets.

In this embodiment, these PAT and PMT are included as the TS packets 146 to be stored in the TS object 142 shown in FIG. 4. That is, when the transport stream as shown in FIG. 6 is transferred, the transferred transport stream can be directly recorded onto the optical disc 100, which is a great advantage.

Furthermore in this embodiment, the PAT and the PMT recorded as such are not referred to when the optical disc 100 is reproduced. Instead, referring to the AU table 137 and the ES map table 134 shown in FIG. 3 and mentioned in detail later makes it possible to perform the reproduction effectively and apply to the complicated multi-vision reproduction or the like. For this, in this embodiment, a relationship between packets and the elementary stream obtained by referring to the PAT and the PMT on decoding or recording is stored in the object information file 130, in a form of AU table 137 and ES map table 134, without packetizing or multiplexing.

The object information table relating to the TS object 142 will be mentioned later in detail (see FIGS. 15-19, FIG. 22, FIG. 25 and FIG. 26).

Next, with reference to FIG. 5(b), an explanation will be made to that the video data, the audio data, the sub picture data and the like in the program stream format as shown in FIG. 2(c) is multi-recorded onto the optical disc 100 by the PS pack 146PS. Here, FIG. 5(b) conceptually illustrates that the video or audio stream for program #3 (PG3) in the upper stage (individual stream conforming to MPEG2 program stream standard) and the stream for program #4 (PG4) in the middle stage (individual stream also conforming to MPEG2 program stream standard) are multiplexed, and the program stream (PS) for these two programs (PG3 and PG4) is formed, under an assumption that a horizontal axis is defined as a time axis.

As shown in FIG. 5(b), in the stream for program #3 (in the upper stage), for example, the video data for program #3 is packetized by the PS pack 146 (e.g. a data length of 2048 bytes) usually larger than the TS packet 146 in FIG. 5(a) (e.g. packet having a data length of 192 bytes including the packet arrival stamp 145 or the like as shown in FIG. 4), and arranged discretely along to the time axis (horizontal axis). In the stream for program #4 (in the middle stage), for example, the video data for program #4 is packetized by the PS pack 146PS, and arranged discretely along to the time axis (horizontal axis). Then, these PS packs 146 are multiplexed to form the program stream for these two programs (in the lower stage). Incidentally, omitted for convenience of explanation in FIG. 5(b), in practice, the stream made of PS packs obtained by packetizing the sub picture data or the stream made of PS packs obtained by packetizing the audio data may be packetized as the stream for program #1, as shown in FIG. 2(c). In addition to these, the stream made of PS packs obtained by packetizing the audio data or the stream made of PS packs obtained by packetizing the sub picture data may be also multiplexed, as the stream for program #4.

With regard to the PS object in the object data 140PS (see FIG. 3) relating to the program stream as shown in FIG. 5(b), similarly to the case of the conventional DVD video standard, the stream ID is given to the video stream and the audio stream in the MPEG program stream, and thereby a specific video stream or a specific audio stream to be reproduced is selected from a whole program stream (see FIG. 2(c) and FIG. 5(b)) to perform the reproduction. Furthermore, the sub stream ID is given to an encoded audio stream such as LPCM assigned to the private stream. Thereby, a specific stream to be reproduced is selected from a whole program stream to perform the reproduction. In any case, the stream ID or the sub stream ID is recorded, for each stream, in the ES map table and the object information table including AU table.

The object information table relating to the PS object will be mentioned later in detail, with the specific example (see FIGS. 20-22, FIG. 25 and FIG. 27).

The identification information indicating that the object is a still picture is given to the still object in the object data 140ST relating to the still picture shown in FIG. 3. Thereby, a specific still picture information to be reproduced is selected to perform the reproduction. The object information table relating to the still picture object will be mentioned later in detail, with the specific example (see FIG. 28, FIG. 29 and FIG. 32).

Figure 7:
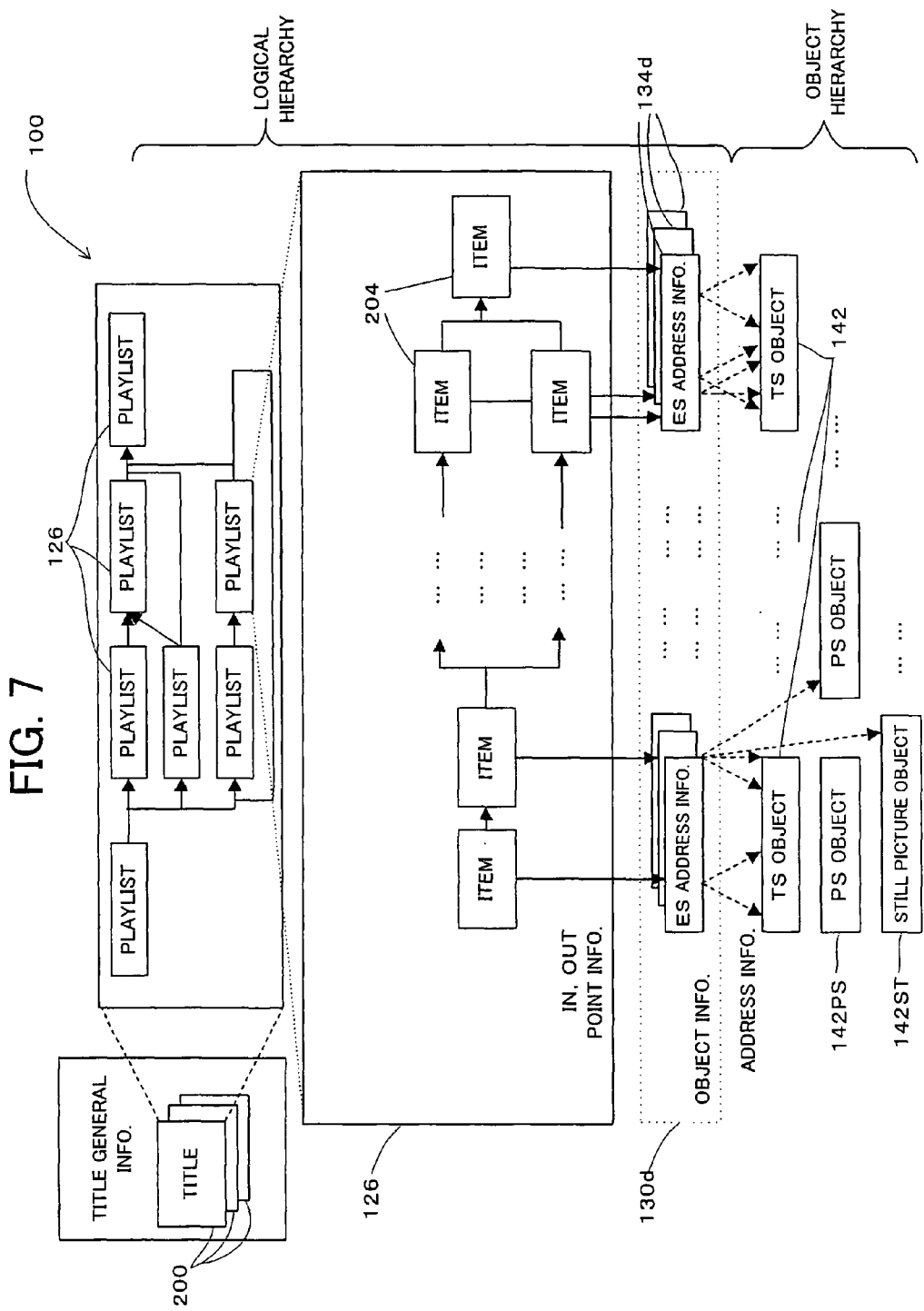
FIG. 7 is a schematic diagram of the data logical structure on the optical disc in the embodiment, focusing on the development from the logical hierarchy to the object hierarchy or the entity hierarchy.

Next, with reference to FIG. 7, the logical structure of data on the optical disc 100 will be discussed. FIG. 7 schematically illustrates the logical structure of data on the optical disc 100, focusing on the development from the logical hierarchy to the object hierarchy or the entity hierarchy.

In FIG. 7, one or more titles 200 that are a logical large unit such as one movie or one TV program are recorded onto the optical disc 100. Each title 200 logically consists of one or more playlists 126. In each title 200, the plurality of playlists may have a sequential structure or may have a branch structure.

Incidentally, in the case of a simple logical structure, one title 200 consists of one playlist 126. On the other hand, one playlist 126 may be referred to from a plurality of titles 200.

Each playlist 126 is logically made of a plurality of items (play items) 204. In each playlist 126, a plurality of items 204 may have the sequential structure or may have the branch structure. On the other hand, one item 204 may be referred to from a plurality of playlists 126. The aforementioned in-point information and out-point information described by the item 204 logically designates the reproduction range of the TS object 142, the PS object 142PS or the still picture object 142ST (hereinafter referred to as "TS object 142 and the like" as appropriate). Then, the object information 130d about the logically designated reproduction range is referred to and thereby the reproduction range of the TS object 142 and the like is physically designated, via the file system finally. Here, the object information 130d includes various information to reproduce the TS object 142 and the like, such as the attribute information of the TS object 142 and the like, the ES address information 134d and the like required for the data search in the TS object 142 and the like (incidentally, the ES map table 134 shown in FIG. 3 includes a plurality of ES address information 134d).

Then, when the information record and reproduce apparatus reproduces the TS object 142 and the like as mentioned below, a physical address to be reproduced in the TS object 142 and the like is obtained from the item 204 and the object information 130d so that a desired elementary stream is reproduced.

Thus, in this embodiment, the in-point information and out-point information recorded on/in the item 204, as well as the ES address information 134d recorded in the ES map table 134 (see FIG. 3) of the object information 130d make it possible to perform the association from the logical hierarchy to the object hierarchy in the reproduction sequence so that the elementary stream is reproduced.

As discussed above, in this embodiment, units of the TS packet 146 or PS pack 146PS (see FIGS. 5 and 6) are multiplexed on the optical disc 100. Thereby, the transport stream and program stream including a plurality elementary stream as shown in FIG. 2(b) and FIG. 2(c) can be recorded onto the optical disc 100. In this embodiment, in the case that digital broadcasting is recorded onto the optical disc 100, a plurality of programs can be recorded at the same time, within the restriction of the record rate. Nevertheless, herein record method in which a plurality of programs is multiplexed relative to one TS object 142 and the like for the recording. Now, an embodiment of the information record and reproduce apparatus capable of performing the record processing will be discussed.

Incidentally, in the following embodiment, the information record and reproduction apparatus is constructed so as to record and reproduce both the transport stream and the program stream on the same optical disc 100. This includes an embodiment of the information record and reproduction apparatus capable of handling only one of these streams. That is, if a switching structure of streams is removed, and a structure relating to only one of these streams is remained, the information record and reproduction apparatus can be constructed specifically for only one of these streams.

(Information Record and Reproduction Apparatus)

Next, with reference to FIG. 8 to FIG. 13, an embodiment of the information record and reproduction apparatus of the present invention will be discussed. Here, FIG. 8 is a block diagram of the information record and reproduction apparatus, and each of FIG. 9 to FIG. 13 illustrates the operational flow of the information record and reproduction apparatus.

Figure 8:
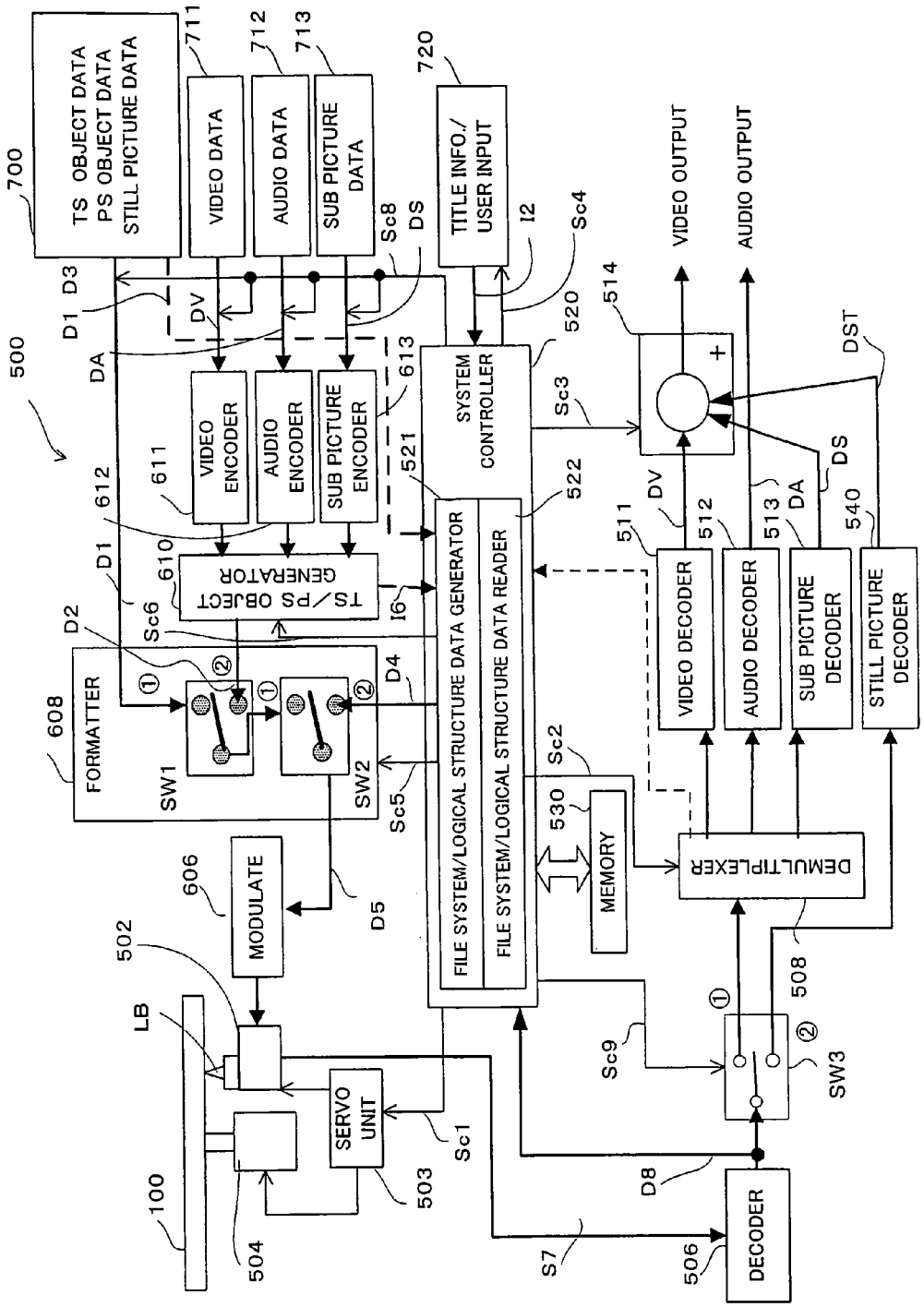
FIG. 8 is a block diagram illustrating the information record and reproduction apparatus in the embodiment of the present invention.

In FIG. 8, the information record and reproduction apparatus 500 is roughly divided into a reproduction system and a record system. The information record and reproduction apparatus 500 is constructed to record the information onto the optical disc 100 mentioned above and reproduce the information recorded thereon/therein. In this embodiment, the information record and reproduction apparatus 500 is thus for recording and reproduction. Nevertheless, basically, the information recode apparatus of the present invention can be constructed with the record system of the information record and reproduction apparatus 500 and the information reproduction apparatus of the present invention can be constructed with the reproduction system of the information record and reproduction apparatus 500.

The information record and reproduction apparatus 500 is provided with: an optical pickup 502; a servo unit 503; a spindle motor 504; a decoder 506; a demultiplexer 508; a video decoder 511; an audio decoder 512; a sub picture decoder 513; an adder 514; a system controller 520; a memory 530; a still picture decoder 540; a modulator 606; a formatter 608; a TS/PS object generator 610; a video encoder 611; an audio encoder 612; and a sub picture encoder 613. The system controller 520 includes a file system/logical structure data generator 521 and a file system/logical structure data reader 522. Furthermore, the memory 530 and a user interface 720 to give a user input such as title information are connected to the system controller 520.

Among these constitutional elements, the decoder 506, the demultiplexer 508, the video decoder 511, the audio decoder 512, the sub picture decoder 513, the adder 514 and the still picture decoder 540 mainly constructs the reproduction system. On the other hand, among these constitutional elements, the modulator 606, the formatter 608, the TS/PS object generator 610, the video encoder 611, the audio encoder 612 and the sub picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, for the record system, an object data source 700 as a data source of TS object data, PS object data and still picture data; a video data source 711; an audio data source 712; and a sub picture data source 713 are prepared. Furthermore, the file system/logical structure data generator 521 disposed in the system controller 520 is used mainly in the record system, and the file system/logical structure reader 522 is used mainly in the reproduction system.

The optical pickup 502 irradiates light beam LB such as laser beam onto the optical disc 100, at the first power as reading light during the reproduction, and modulates and irradiate LB at the second power as writing light on recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 8 to FIG. 12, a specific structure and the operation of each constitutional element constructing the record system of the information recode and reproduction apparatus 500 will be explained in each case.

(i-1) In the Case that the Already Generated Object is Used:

This case will be discussed, with reference to FIG. 8 and FIG. 9.

In FIG. 8, the object data source 700 may be made of the storage such as a video tape, a memory, for storing the object data D1 that corresponds to the TS object data, the PS object data or the still picture data.

Figure 9:
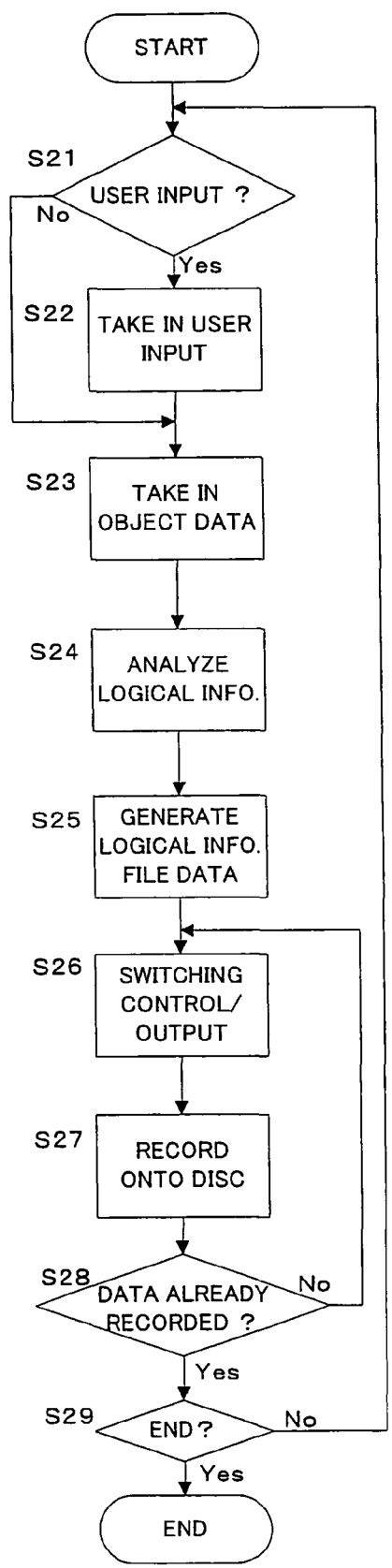
FIG. 9 is a flow chart illustrating a record operation (part 1) of the information record and reproduction apparatus in the embodiment.

Firstly in FIG. 9, an information of each title (e.g. the construction or the contents of the playlist etc.) to be logically constructed on the optical disc 100 using the object data D1 is inputted into the system controller 520, as the user input I2 such as the title information, via the user interface 720. Then, the system controller 520 takes in the user input I2 such as the title information via the user interface 720 (step S21: Yes, and step S22). In this case, the user interface 720, under control of the control signal Sc4 from the system controller 520, can perform the input operation in response to the contents to be recorded, such as the selection via the title menu screen. Incidentally, if the user input is already performed (step S21: No), these processes are omitted.

Next, the object data source 700 outputs the object data D1, under control of the control signal Sc8 to instruct the data reading from the system controller 520. Then, the system controller 520 takes in the object data D1 from the object data source 700 (step S23), and performs the data array analysis (e.g. a record data length and the like) of the object data D1, the analysis of each elementary stream structure (e.g. interpretation of ES_PID (elementary stream/packet identification number)), on the basis of the PAT, the PMT and the like packetized with the video data as mentioned above, due to the TS analysis function in the file system/logical structure data generator 521. Alternatively, due to the PS analysis function in the file system/logical structure data generator 521, it may perform the interpretation of each stream structure in the program stream (e.g. interpretation of stream ID or sub stream ID) (step S24).

Next, the system controller 520 makes the file system/logical structure data generator 521 generate the disc information file 110, the playlist information file 120, the object information file 130 and the file system 105 (see FIG. 3), as the logical information file data D4, on the basis of the analysis result of each elementary stream and the data array of the object data D1, as well as the user input I2 such as the taken-in title information (step S25). The memory 530 is used to generate this logical information file data D4.

Incidentally, variations in which the data about the information of each elementary stream structure and the data array of the object data D1 is prepared in advance are naturally conceived, all of which are encompassed within a scope of the embodiment.

In FIG. 8, the formatter 608 is for formatting the data array to store both the object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

At step S26 in FIG. 9, (i) the logical information file data D4 from the file system/logical structure data generator 521 at the step S25 or (ii) the TS object data D1 from the TS object data source 700 is outputted through the formatter 608 by the switching-control by the formatter 608 as constructed above (step S26).

The output selectively outputted from the formatter 608 is transmitted to the modulator 606 as disc image data D5, is modulated by the modulator 606, and is recorded onto the optical disc 100 through the optical pickup 502 (step S27). The system controller 520 also performs the disc record control in this case.

Then, if both the logical information file data D4 generated at the step S25 and the corresponding object data D1 have not been completely recorded yet, the operational flow returns to the step S26, continuing to the record (step S28: No). Incidentally, there is no preference in the record order of the logical information file data D4 and the corresponding object data D1.

On the other hand, if the both the logical information file data D4 generated at the step S25 and the corresponding object data D1 have been already recorded, it is judged whether or not the recording onto the optical disc 100 is to be ended, on the basis of the presence or absence of an end command (step S29). If it is not to be ended (step S29: No), the operational flow returns to the step S21, continuing the record processing. On the other hand, if it is to be ended (step S29: Yes), a series of record processing ends.

As described above, the information record and reproduction apparatus 500 performs the record processing in the case of using the already prepared TS object.

Incidentally, the example in FIG. 9 shows that the logical information file data D4 and the corresponding object data D1 are outputted at the step S26, after preparing the logical information file data D4 at the step S25. However, it is also possible to perform the output of the object data D1 and/or the record of the object data D1 onto the optical disc 100 before the step S25, and after or in parallel with this recording, it is possible to generate and record the logical information file data D4.

Figure 10:
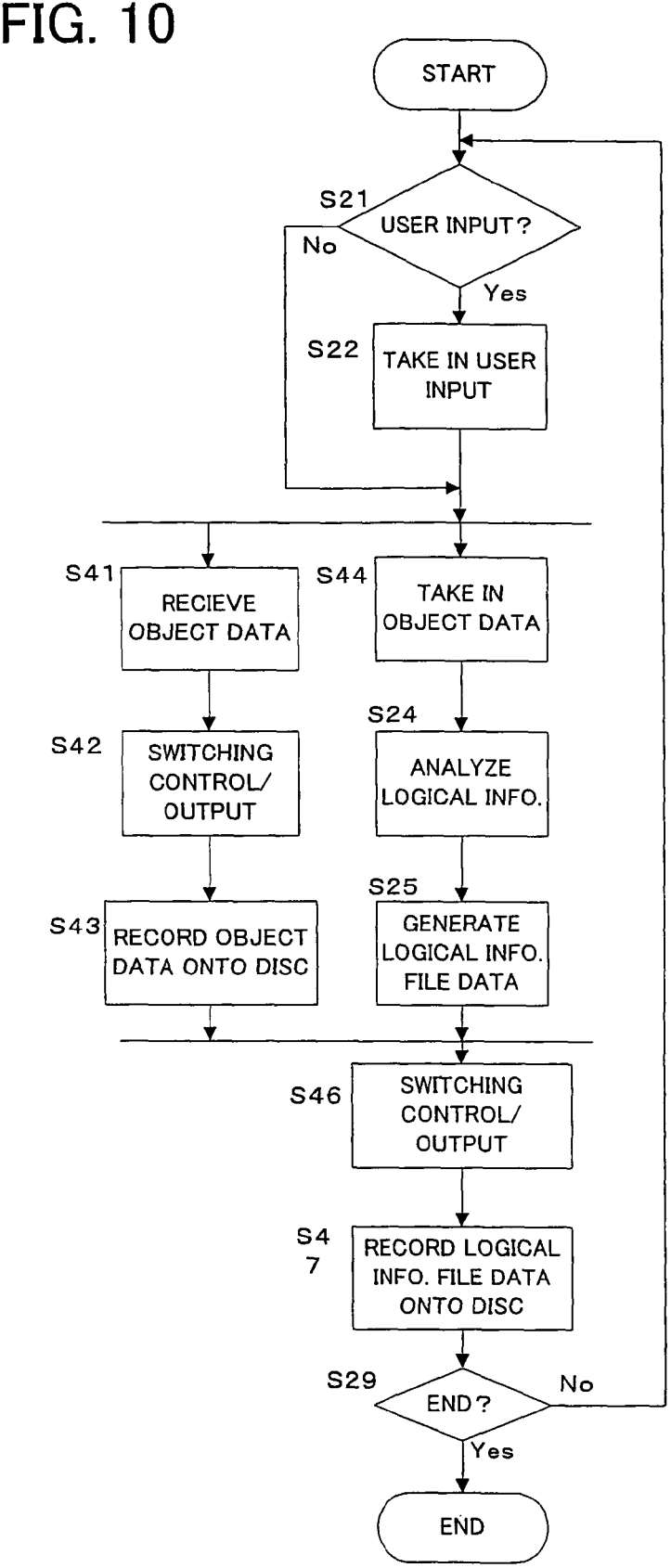
FIG. 10 is a flow chart illustrating a record operation (part 2) of the information record and reproduction apparatus in the embodiment.

(i-2) The Case of Receiving the Stream on Air and Recording it:

This case will be explained with reference to FIG. 8 and FIG. 10. Incidentally, in FIG. 10, the same steps as those in FIG. 9 have the same step reference numbers, and their explanation will be omitted as occasion demands.

Again, in this case, the similar processing is performed, as is "the case of using the already prepared object" described above. Therefore, focusing on the differences from this case, the explanation will be done hereinafter.

In the case of receiving the transport stream or program stream on air and recording it, the object data source 700 is provided with a receiver (set top box) for receiving the digital broadcast on air, for example, receives the object data D1, and transmits it to the formatter 608 in real time (step S41). At the same time, reception information D3 (i.e. information corresponding to the data transmitted through the receiver and the interface of the system controller 520) including the program construction information, the ES_PID information as described later, the stream ID, the sub stream ID and the like which are deciphered upon receiving is taken into the system controller 520 and is stored into the memory 530 (step S44).

In the meantime, the object data D1 outputted to the formatter 608 is outputted to the modulator 606 by the switching-control of the formatter 608 (step S42), and is recorded onto the optical disc 100 (step S43).

Along with these operations, using the program construction information, the ES_PID information, the stream ID, the sub stream ID and the like included in the reception information D3 taken-in upon receiving and stored in the memory 530, the file system/logical structure data generator 521 prepares the logical information file data D4 (step S24 and step S25). Then, after the completion of recording a series of the object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input I2 such as the title information and the like from the user interface 720 to the program construction information, the ES_PID information, the stream ID, the sub stream ID and the like stored in the memory 530, it is possible to prepare the logical information file data D4 by the system controller 520 and additionally record this onto the optical disc 100.

As described above, the information record and reproduction apparatus 500 performs the record processing in the case of receiving the transport stream or program stream on air and recording it in real time.

Incidentally, if all of the data received in broadcasting is once stored into an archive apparatus, and then, if this is used as the object source 700, the same processing as that in "the case of using the already prepared object" will do.

Figure 11:
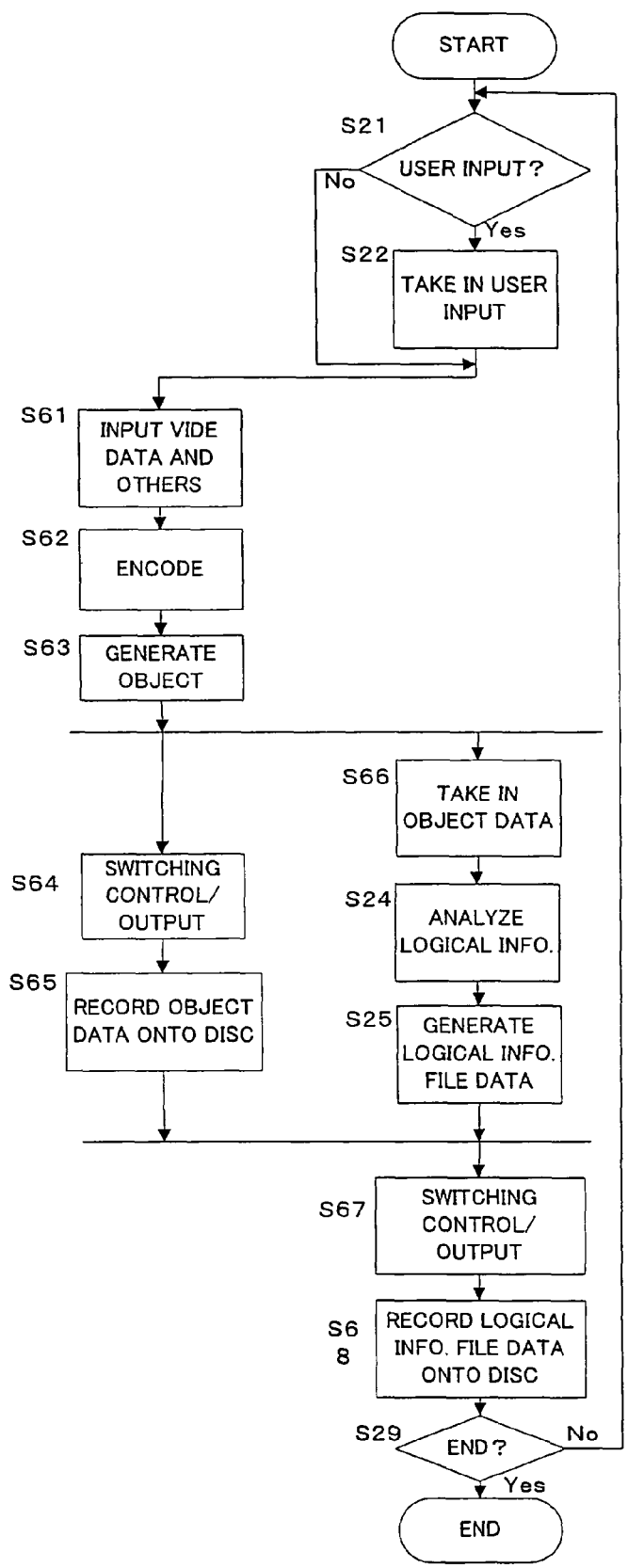
FIG. 11 is a flow chart illustrating a record operation (part 3) of the information record and reproduction apparatus in the embodiment.

(i-3) The Case of Recording the Video Data, the Audio Data and the Sub-Picture Data This case will be explained with reference to FIG. 8 and FIG. 11. Incidentally, in FIG. 11, the same steps as those in FIG. 9 have the same step reference numbers, and their explanation will be omitted as occasion demands.

In the case of recording the video data, the audio data, and the sub-picture data, which are individually prepared in advance, the video data source 711, the audio data source 712, and the sub-picture data source 713 are individually provided with the storage, such as a video tape and a memory, and store a video data DV, an audio data DA, and a sub-picture data DS, respectively.

These data sources are controlled by the control signal Sc8, giving an instruction for reading out the data, from the system controller 520. And these data sources transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 perform a predetermined type of encode processing (step S62).

The TS/PS object generator 610 is controlled by a control signal Sc6 from the system controller 520 and converts the data encoded in this manner to the TS object data constituting the transport stream or the PS object data constituting the program stream (step S63). In this case, the data array information of each TS object data (e.g. a record data length and the like) and the construction information of each elementary stream (e.g. the ES_PID, as described later, and the like), or the data array information of each PS object data and the construction information of the program stream (e.g. the stream ID, the sub stream ID and the like), are transmitted from the TS/PS object generator 610 to the system controller 520 as information 16 and are stored into the memory 530 (step S66).

On the other hand, the object data D2 that is the TS object data or the PS object data generated by the TS/PS object generator 610 is transmitted to the ② side of the switch Sw1 of the formatter 608. Namely, when formatting the object data D2 from the TS/PS object generator 610, the formatter 608 is switching-controlled by the switch control signal Sc5 from the system controller 520 to shift the switch Sw1 to the ② side and the switch Sw2 to the ① side, thereby outputting the object data D2 (step S64). Then, this object data D2 is recorded onto the optical disc 100 through the modulator 606 (step S65).

Along with these operations, using the data array information of each object data and the construction information of each stream taken into the memory 530 as the information 16, the file system/logical structure data generator 521 prepares the logical information file data D4 (step S24 and step S25). Then, after the completion of recording a series of the object data D2, this is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input I2 such as the title information and the like from the user interface 720 to these information stored in the memory 530, it is possible to prepare the logical information file data D4 by the file system/logical structure generator 521 and additionally record this onto the optical disc 100.

As described above, the information record and reproduction apparatus 500 performs the record processing in the case of recording the video data, the audio data, and the sub-picture data, which are individually prepared in advance.

Incidentally, this record processing is applicable even when recording an arbitrary content the user has.

(i-4) The Case of Recording the Data by Authoring

Figure 12:
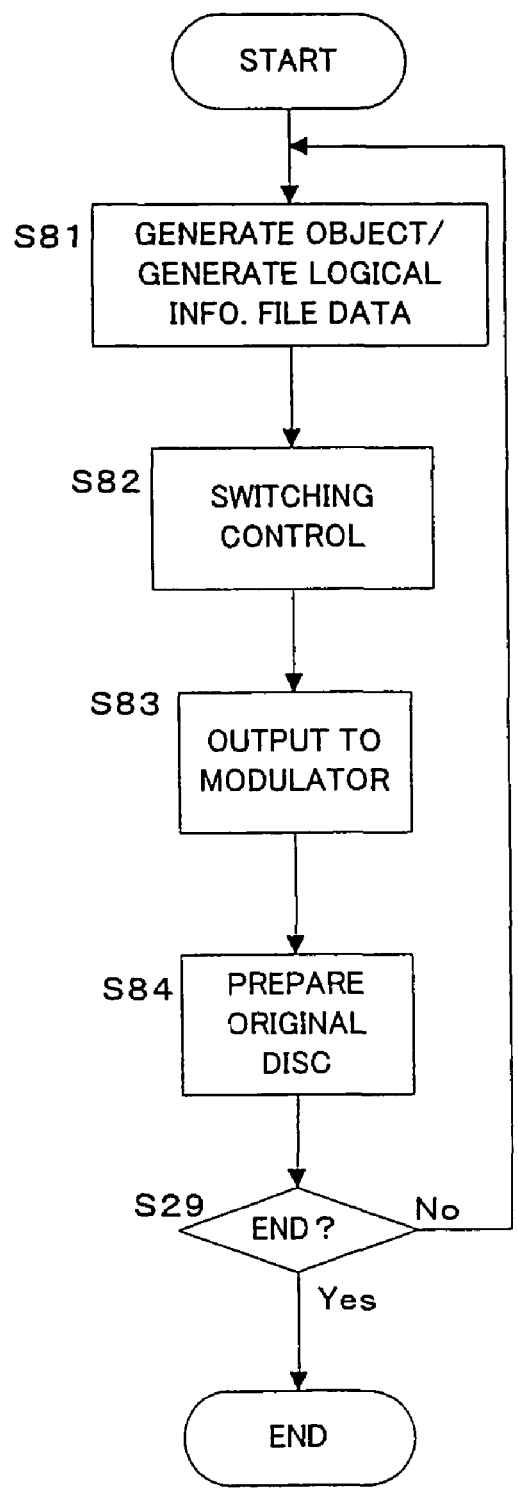
FIG. 12 is a flow chart illustrating a record operation (part 4) of the information record and reproduction apparatus in the embodiment.

This case will be explained with reference to FIG. 8 and FIG. 12. Incidentally, in FIG. 12, the same steps as those in FIG. 9 have the same step reference numbers, and their explanation will be omitted as occasion demands.

In this case, by combining the above described three types of record processing in the three cases, an authoring system generates the TS object or the PS object, the logical information file data, and the like in advance (step S81), and then completes the processing of switching-control performed at the formatter 608 (step S82). Then, the information obtained by this operation is transmitted to the modulator 606 equipped in front side and/or back side of an original disc cutting machine, as the disc image data D5 (step S83), and this cutting machine prepares the original disc (step S84).

(ii) Structure and Operation in Reproduction System

Next, the specific structure and operation of each constitutional element constituting the reproduction system of the information record and reproduction apparatus 500 will be explained with reference to FIG. 8 and FIG. 13.

In FIG. 8, via the user interface 720, the title to be reproduced from the optical disc 100, its reproduction condition and the like are inputted to the system controller 520, as the user input I2 such as the title information and the like. In this case, under control of the control signal Sc4 from the system controller 520, the input processing suitable for the content to be reproduced, such as a selection on a title menu screen, can be performed by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) as being a not-multiplexed information part included in this demodulated data D8 are supplied to the system controller 520. On the basis of this logical information file data, the system controller 520 performs various reproduction control, such as processing of determining a reproduction address and controlling the optical pickup 502.

On the other hand, as for the object data that is the TS object data or the PS object data as being a multiplexed information part included in the demodulated data D8, the demultiplexer 508 is controlled by a control signal Sc2 from the system controller 520 to demultiplex the object data. Here, when the access to the reproduction position address is terminated under the reproduction control by the system controller 520, the control signal Sc9 shifts the switch Sw3 to ① side (i.e. the demultiplexer 508 side) for the switching control, and the control signal Sc2 controls the demultiplexer 508 so as to start demultiplexing in a timing suitable for the TS object or in a timing suitable for the PS object.

Regardless of whether the object data included in the demodulated data D8 is the TS object data or the PS object data, the control signal Sc2 switches the internal processing for TS or for PS, and thereby the demultiplexer 508 transmits and supplies the video packet, the audio packet and the sub-picture packet to the video decoder 511, the audio decoder 512 and the sub-picture decoder 513, respectively. Then, the object data is decoded and thereby the video data DV, the audio data DA and the sub-picture data DS are respectively generated.

Incidentally, the packets obtained by packetizing the PAT or the PMT, included in the transport stream shown in FIG. 6, are included respectively as a part of the demodulated data D8; however, they are discarded or abandoned at the demultiplexer 508.

On the other hand, if the demodulated data D8 includes the still picture data in JPEG format, the bitmap format and the like, the ES map table or the like in the object information file is referred to, and thereby the system controller firstly detects that the still picture data is included. Then, the system controller 520 shifts the switch Sw3 to ② side (i.e. the still picture decoder 540 side) for the switching control by the control signal Sc9b. Thereby, the still picture data included in the demodulate data D8 is appropriately decoded by the still picture decoder 540. Then, the still picture decoder 540 outputs the decode process result as the still picture data DST to the adder 514.

The adder 514 is controlled by a control signal Sc3, giving an instruction of the mixing, from the system controller 520, and mixes or superimposes in a predetermined timing the video data DV and the sub-picture data DS, which are respectively decoded at the video decoder 511 and the sub-picture decoder 513. Alternatively, it mixes or superimposes the still picture data DST from the still picture decoder, or outputs it alone. The result is outputted as a video output from the information record and reproduction apparatus 500 to a TV monitor, for example.

On the other hand, the audio data DA decoded at the audio decoder 512 is outputted as an audio output from the information record and reproduction apparatus 500 to an external speaker, for example.

Here, the specific example of a reproduction processing routine by the system controller 520 will be explained with reference to FIG. 13.

Figure 13:
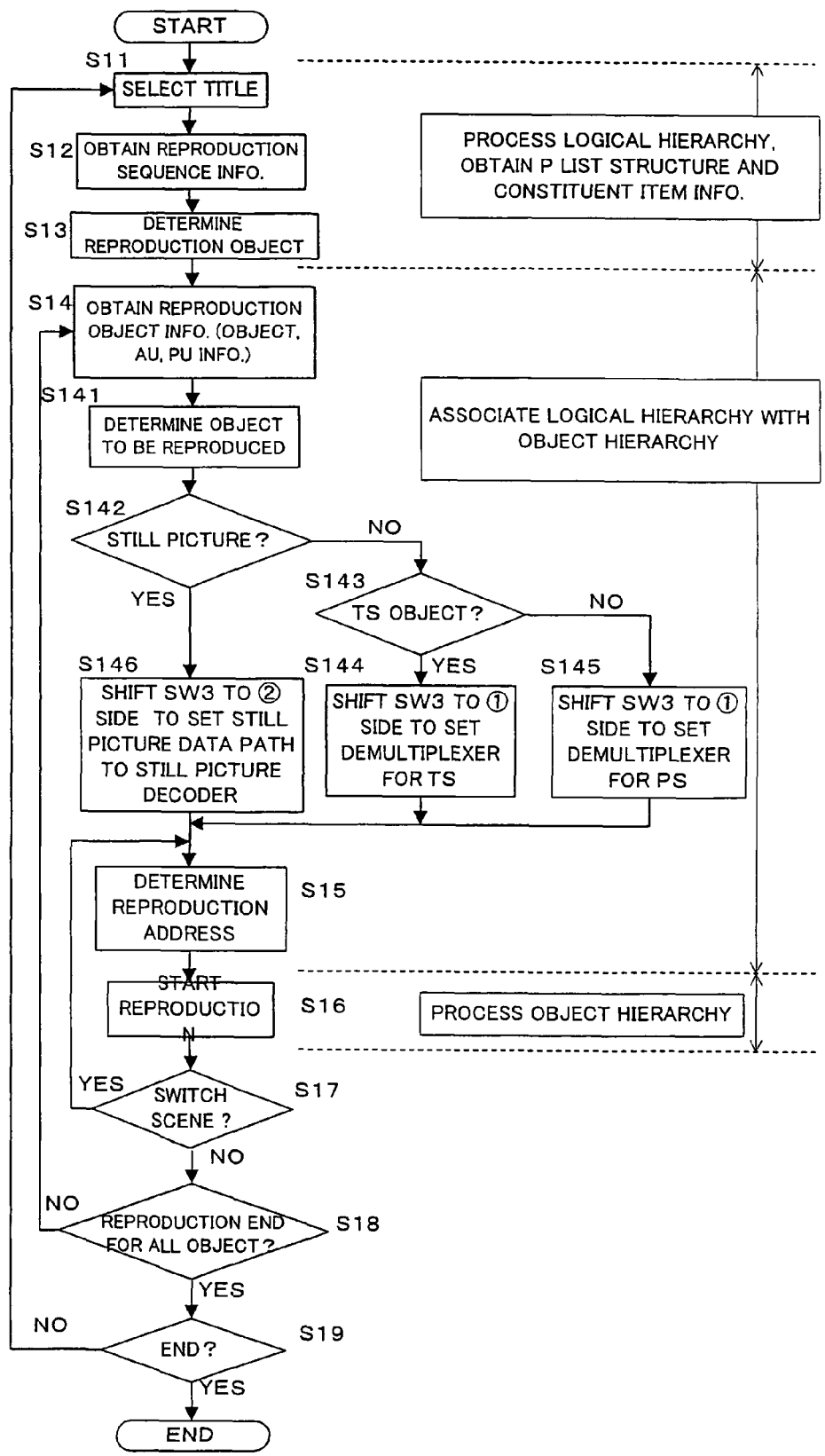
FIG. 13 is a flow chart illustrating a reproduction operation of the information record and reproduction apparatus in the embodiment.

In FIG. 13, it is assumed that as an initial condition, the recognition of the optical disc 100 in the reproduction system and the recognition of a volume structure and a file structure by the file system 105 (see FIG. 3) have been already completed by the system controller 520 and the file system/logical structure data reader 522 inside the system controller 520. Here, an explanation will be made to the operational flow after obtaining the total quantity of the total titles from the disc general information 112 in the disc information file 110 and then choosing or selecting one title from among them.

Firstly, the choice or selection of the title is performed via the user interface 720 (step S11), and the system controller 520 obtains the information about the reproduction sequence from a reading result of the file system/logical structure data reader 522. More specifically, the processing in the logical hierarchy (i.e. obtaining the information for indicating a playlist structure and the information about each of the Items constituting the playlist (see FIG. 7)) is performed (step S12). By this, a reproduction object is determined (step S13).

Then, the object information file 130 relating to the TS object, the PS object or the still picture object as being the reproduction object is obtained. Especially in the embodiment, the AU (Association Unit) information 138 and the PU (Presentation Unit) information 302I (see FIG. 25 and FIG. 31 as mentioned later) are also obtained as the information stored in the object information file 130 (step S14). These obtained information allow the association or correlation from the above described logical hierarchy to the object hierarchy (see FIG. 7).

Then, on the basis of the obtained reproduction sequence information and object information, the object to be reproduced next is determined (step S141).

Then, it is judged whether the determined object to be reproduced is the still picture object or not (step S142). If it is not the still picture object (step S142: No), it is judged whether it is the TS object or not (step S143).

As the result of the judgement at step S143, if it is the TS object (step S143: Yes), the control signal Sc9 from the system controller 520 shifts the switch Sw3 to ① side, and the control signal Sc2 from the system controller 520 sets the demultiplexer 508 for the TS (step S144).

On the other hand, as the result of the judgment at step S143, if it is not the TS object (step S143: No), the control signal Sc9 from the system controller 520 shifts the switch Sw3 to ① side, and the control signal Sc2 from the system controller 520 sets the demultiplexer 508 for the PS (step S145).

On the other hand, as the result of the judgement at step S142, if it is the still picture object (step S142: Yes), the control signal Sc9 from the system controller 520 shifts the switch to ② side (step S146).

After any one processing of the above steps S144 to S146 is terminated and the demultiplexer 508 and each decoder are ready for the processing, the reproduction address of the object to be reproduced is determined (step S15) and then the object hierarchy processing is started, i.e. the reproduction is actually started (step S16).

During the reproduction, it is monitored whether or not a command for a "scene switching" corresponding to switching PU 302 in the AU 138 based on the AU information 138 and the PU information 302I as mentioned below is inputted (step S17). Here, the command for the "scene switching" is inputted (step S17: Yes), the operational flow goes back to step S15 to repeat the processings from step S15 to step S17. On the other hand, if the command for the "scene switching" is not inputted (step S17: No), it is judged whether or not reproductions of all objects to be reproduced are completed (step S18). At this stage, if reproductions of all objects to be reproduced are not completed (step S18: No), the operational flow goes back to step S14 to repeat the following processings.

On the other hand, if reproductions of all objects to be reproduced are completed (step S18: Yes), it is judged whether or not a command to terminate the reproduction processing is inputted (step S19). At this stage, if the termination command is not inputted (step S19: No), the operational flow goes back to step S11 to repeat processings from step S11 to step S19. On the other hand, if the termination command is inputted (step S19: Yes), a series of reproduction processing ends.

(Access Flow on Reproduction)

Figure 14:
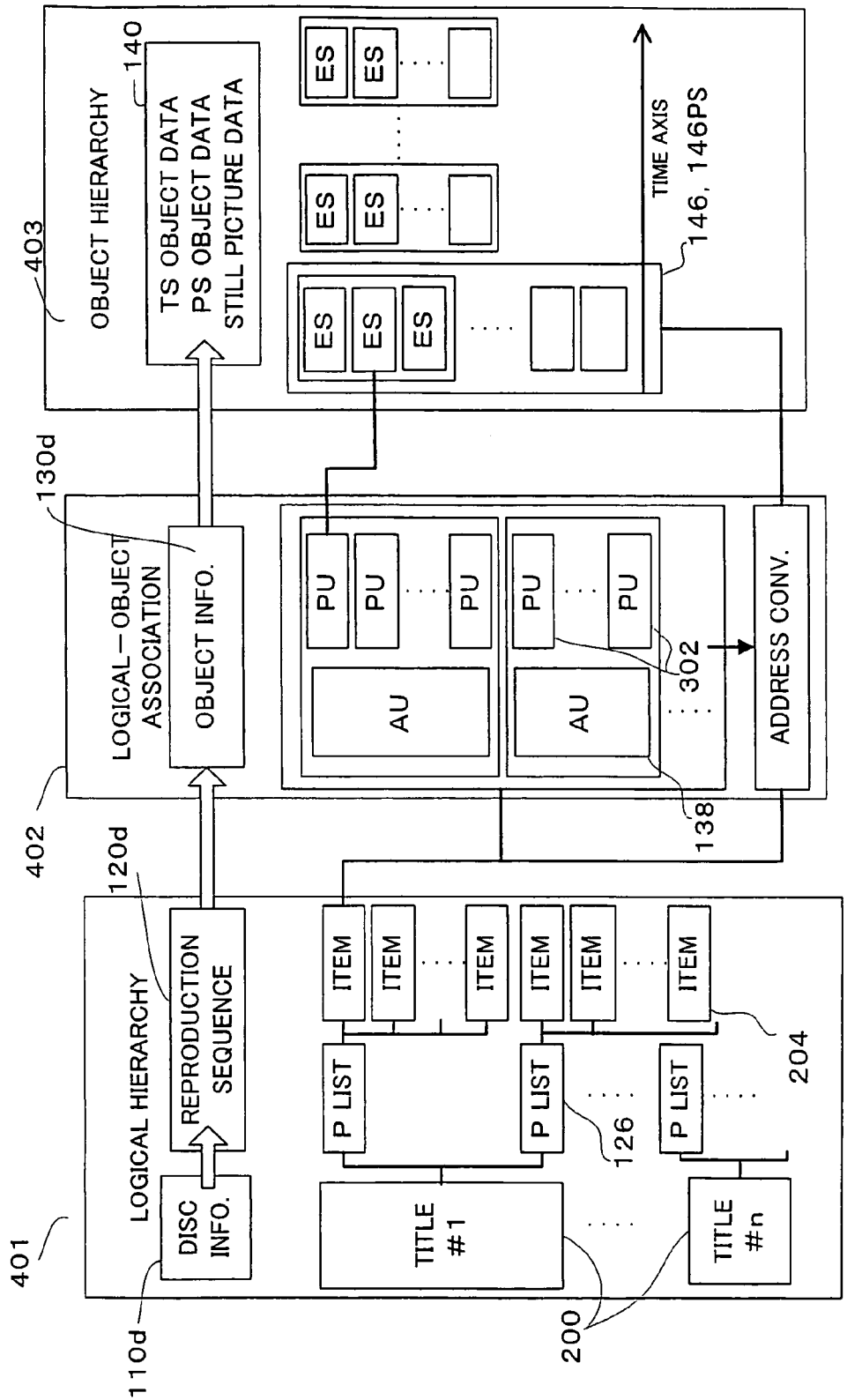
FIG. 14 is a conceptual diagram illustrating an entire access flow during the reproduction, in relation to the logical structure of the optical disc.

Next, with reference to FIG. 14, the access flow on reproduction by the information record and reproduction apparatus 500, employing the AU (Association Unit) information 138 and the PU (Presentation Unit) information 302, will be explained as one of the features of this embodiment, with the logical structure of the optical disc 100. FIG. 14 schematically illustrates an entire access flow on reproduction, in relation to the logical structure of the optical disc 100.

In FIG. 14, the logical structure of the optical disc 100 is categorized roughly into the following three hierarchies: a logical hierarchy 401; an object hierarchy 403; and a logical-object association hierarchy 402 mutually associating those two hierarchies.

Among them, the logical hierarchy 401 is a hierarchy for logically specifying various logical information to be used to reproduce the desired title when reproducing, as well as the playlist (P list) to be reproduced and its construction. In the logical hierarchy 401, disc information 110d indicating the entire titles 200 and the like on the optical disc 100 is written within the disc information file 110 (see FIG. 3), and further, reproduction sequence information 120d of the entire contents on the optical disc 100 is written within the playlist information file 120 (see FIG. 3). More specifically, as the reproduction sequence information 120d, the construction of one or more playlists 126 is written in each title 200, and the construction of one or more Items 204 (see FIG. 7) is written in each playlist 126. Then, at the time of the access during the reproduction, the logical hierarchy 401 as described above specifies the title 200 to be reproduced, the playlist 126 corresponding to this title 200, and further the Item 204 corresponding to this playlist 126.

Then, the logical-object association hierarchy 402 is a hierarchy for specifying the attribute and the physical storing address of various object data in the object data file 140 to be reproduced, so as to specify the combination and/or the construction of the TS object data, the PS object data and the still picture data in the object data file 140 as being the entity data and to perform an address conversion to the object hierarchy 403 from the logical hierarchy 401, on the basis of the information specified in the logical hierarchy 401 as described above. More specifically, in the logical-object association hierarchy 402, the object information data 130d, which separates a group of the contents constituting each Item 204 into units of the AU 138 and which finely separates each AU 138 into units of the PU 302, is written in the object information file 130 (see FIG. 3).

Here, the "PU (Presentation Unit) 302" is a unit associating and uniting a plurality of elementary streams by the reproduction switchable unit. If there are three audio streams in the PU 302, the user can freely switch these three audio (e.g. audio for each language), during the reproduction of this vision.

On the other hand, the "AU (Associate Unit) 138" is a unit uniting a plurality of elementary streams such as the video stream in the TS object used in one title, and made of one or more PU 302. More specifically, it is a unit uniting the elementary stream packet IDs (ES_PID) for each TS object, indirectly via the PU 302. This AU 138 corresponds to an assembly made of a plurality of programs having a specific inter-relationship in view of the contents, such as a plurality of programs switchable to each other in the multi-source broadcasting. The PU 302 belonged to the same AU 138 corresponds to assembly made of one or more elementary stream each constructing a plurality of programs switchable to each other by the user operation during the reproduction.

Therefore, if the AU 138 to be reproduced is identified, and the PU belonged to the AU is identified, the elementary stream to be reproduced is identified. That is, if the TS object is recorded, a desired elementary stream can be reproduced from the multi-recorded optical disc 100, without using the PAT or the PMT shown in FIG. 6.

Incidentally, a further specific data structure of the AU information 138I and the PU information 302I, each defining the AU 138 and the PU 302, will be discussed later, with reference to FIG. 25, FIG. 31 and the like.

If the TS object data is recorded as the object data, the elementary stream to be actually reproduced is identified or designated by the ES_PID that is a packet ID (see FIG. 6) of the elementary stream, on the basis of the PU information 302. At the same time, the information indicating the start time point and the end time point of the reproduction is converted to the elementary stream address information, and thereby the contents in a specific area (or a specific time range) of a specific elementary stream is reproduced.

Alternatively, if the PS object data is recorded as the object data, the stream in the program stream to be actually reproduced is identified or designated by a stream ID or sub stream ID of each stream, on the basis of the PU information 302. At the same time, the information indicating the start time point and the end time point of the reproduction is converted to the address information of each stream, and thereby the contents in a specific area (or a specific time range) of a specific stream is reproduced.

Furthermore, if the still picture data is recorded as the object data, the address information, the data length and the data format of each still picture data are identified or designated, on the basis of the ES map table (see FIG. 32) for the still picture.

Thus, in the logical-object association hierarchy 402, an address conversion is performed from a logical address relating to each item 204 to a physical address relating to each PU 302.

Next, the object hierarchy 403 is a physical hierarchy to reproduce various data in the actual object data file 140. In the object hierarchy 403, the TS object data, the PS object data and the still picture data are written within the object data file 140 (see FIG. 3).

More specifically, in the case of the TS object data, TS packets 146 constructing a plurality of elementary streams (ES) are multiplexed. The multiplexed packets are disposed along the time axis to form the transport stream (see FIG. 5(a)). Then, a plurality of TS packets multiplexed at each time point is associated with the PU 302 identified by the logical-object association hierarchy 402, for each elementary stream. Incidentally, it is possible to associate a plurality of PUs 302 with one elementary stream (e.g. one elementary stream relating to the same audio data is shared, or one elementary stream relating to the same sub picture data are shared, in a plurality of switchable programs).

Alternatively, in the case of the PS object, PS packs 146PS constructing a plurality of video streams, audio streams, sub picture streams are multiplexed. The multiplexed PS packs are disposed along the time axis to form the program stream (see FIG. 5(b)). Then, a plurality of PS packs which is multiplexed is associated with the PU 302 identified in the logical-object association hierarchy 402, for each stream. Incidentally, it is possible to associate a plurality of PUs 302 with one stream (e.g. the same audio stream is shared or the same sub picture stream is shared in a plurality of switchable programs).

Furthermore, in the case of the still picture data, it is stored as the object file for the still picture in JPEG format, bitmap format and the like, separately from the aforementioned transport stream or program stream (see FIG. 3). The still picture data packetized by the TS packet or the PS pack or not packetized is associated with the PU 302 identified by the logical-object association hierarchy 402. Incidentally, it is possible to associate a plurality of PUs 302 with one still picture data (e.g. the same still picture data is shared in a plurality of switchable programs).

Thus, in the object hierarchy 403, the object data is actually performed, using the physical address obtained from the conversion in the logical-object association hierarchy 402.

As described above, the three hierarchies shown in FIG. 14 allow the performing of the access with respect to the optical disc 100 during the reproduction.

(First Specific Example of Data Structure Recorded onto Optical Disc)

Next, with reference to FIG. 15 to FIG. 22, an explanation will be made to the first specific example of the data structure on the optical disc on which the TS object of the transport stream and the PS object of the program stream are recorded.

Figure 15:
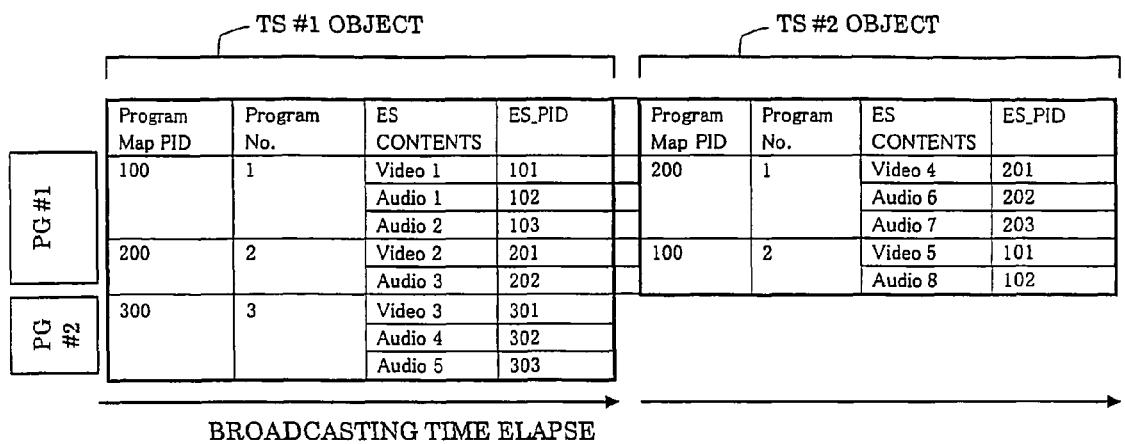
FIG. 15 is a schematic diagram of the data structures of the TS objects #1 and #2 including a plurality of transport streams, in a specific embodiment in the embodiment.
Figure 16:
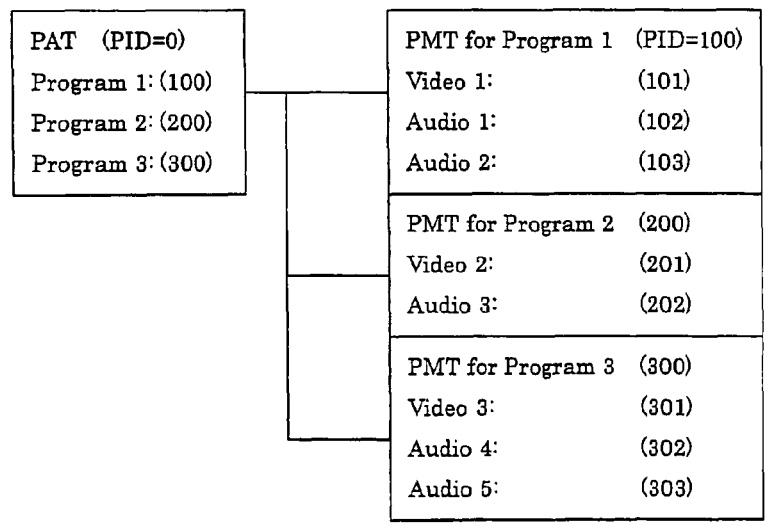
FIG. 16 is a schematic diagram of the data structure of PAT and PMT of the TS object #1, in a specific example of the embodiment.

In this specific example, the explanation will be made to the case that three titles are constructed in the optical disc 100 shown in FIG. 22, as for three TS objects #1, #2 and #3 shown in FIG. 15 to FIG. 19, and two PS objects #4 and #5 shown in FIG. 20 and FIG. 21. Here, FIG. 15 schematically illustrates the data structure of the TS objects #1 and #2 including a plurality of elementary streams. FIG. 16 schematically illustrates the data structure of the PAT and the PMT of the TS object #1 in also this specific example. FIG. 17 schematically illustrates the data structure of the PAT and the PMT of the TS #2 object in also this specific example. FIG. 18 schematically illustrates the data structure of the TS #3 object in also this specific example. FIG. 19 schematically illustrates the data structure of the PAT and the PMT of the TS #3 object in also this specific example. On the other hand, FIG. 20 and FIG. 21 schematically illustrate the data structure of the PS objects #4 and #5 including a plurality of video streams and audio streams in also this specific example. Furthermore, FIG. 22 schematically illustrates the data structure finally constructed on the optical disc 100.

Firstly, as shown in FIG. 15, title #1 is made of the TS #1 object and the TS #2 object by directly using the transport stream used in digital broadcasting, as two TS objects (see FIG. 3). "Program 1" in FIG. 15 is dual broadcasted using two programs whose program map packet ID ("Program Map PID" in FIG. 15) is "100" and "200" respectively, and whose program number ("Program No." in FIG. 15) is "1" and "2" respectively. On the other hand, "Program 2" in FIG. 15 is normal broadcasting using one program whose program map packet ID is "300" and whose program number is "3". For example, the elementary streams (ES) corresponding to the program whose program number is "1" are "Video 1 (Video Stream 1)", "Audio 1 (Audio Stream 1)" and "Audio 2 (Audio Stream 2)", and their elementary stream packet IDs (ES_PID) are "101", "102" and "103", respectively (see FIG. 6). The contents or packet IDs of other elementary streams (ES) are also shown in FIG. 15.

In this specific example as shown in FIG. 16, as for the TS #1 object, the PAT (Program Association Table) and the PMT (Program Map Table) during the broadcasting are constructed to identify three PMTs by one PAT, and to identify individual TS packet of the elementary stream to be reproduced by each PMT.

More specifically, as for the PAT, the packet ID (PID) is set to a reference value "000" for example, on the basis of which the PAT can be firstly identified from among a plurality of packets multiplexed at each time point (see FIG. 6). Furthermore, by referring to the contents of the identified PAT, it is possible to identify the PMT from among a plurality of packets multiplexed at each time point (see FIG. 6), on the basis of "packet ID (e.g. "100") of the PMT for program 1", "packet ID (e.g. "200") of the PMT for program 2", or "packet ID (e.g. "300") of the PMT for program 3".

Furthermore, by referring to the contents of the identified PMT, it is possible to identify the TS packet obtained by packetizing the contents to be reproduced, from among a plurality of packets multiplexed at each time point (see FIG. 6). For example, if the PMT for program 1 is identified, the TS packet can be identified on the basis of "packet ID of TS packet for video stream 1 (e.g. 101)", "packet ID of TS packet for audio stream 1 (e.g. 102)" or "packet ID of TS packet for audio stream 2 (e.g. 103)". Furthermore, if the PMT for program 2 or the PMT for program 3 is identified, it is possible to identify the TS packet to be reproduced.

Particularly in this specific example, a set of data constructing a series of transport stream used for the broadcasting (e.g. a unit or the like broadcasted continuously without CM (commercial message)) is treated as the "TS object" (see FIG. 3). It is assumed that, on broadcasting, two programs are firstly transmitted via three programs using TS #1 object, and the program 2 then ends along the elapse of time, and the program 1 is continuously broadcasted by the TS #2 object with an intermittence of CM. Therefore, the program sequence is switched during the broadcasting.

Furthermore in this specific example as shown in FIG. 17, as for TS #2 object, the PAT and the PMT during the broadcasting are constructed to identify two PMTs by one PAT and to identify individual TS packets of the elementary stream to be reproduced by each PMT.

As shown in FIG. 15 to FIG. 17, in this specific example, one title #1 is constructed directly using the TS #1 object and the TS #2 object during the broadcasting without CM contents.

Furthermore, in this specific example as shown in FIG. 18, title #2 is constructed using the TS #3 object. This TS #3 object is authored to be stored in advance as ROM contents, and having especially two sub picture data elementary streams (i.e. "sub picture 1" and "sub picture 2" as ES contents in FIG. 18), in addition to the video data elementary streams and audio data elementary streams.

In this specific example, as shown in FIG. 19, as for TS #3 object constructing title #2, the PAT and the PMT also have simple structures.

On the other hand, in this specific example as shown in FIG. 20, PS object #4 (#4 object (MPEG-PS data)) includes one video stream "Video 7" and two audio streams "Audio 11" and "Audio 12", to which stream IDs are individually given. Among them, "Audio 12" is a private stream to which a sub stream ID is given in addition to a stream ID.

Furthermore, in this specific example, as shown in FIG. 21, PS object #5 includes one video stream "Video 8" and two audio streams "Audio 13" and "Audio 14", to which stream IDs are individually given.

Among them, "Audio 14" is a private stream to which a sub stream ID is given in addition to a stream ID. The sub stream ID makes it possible to identify each stream recorded in one private stream from each other.

For example, the MPEG video stream is identified by the stream ID "1110 xxxx" (x=0 or 1). In this case, the sub stream ID is not given. On the other hand, MPEG audio stream is identified by the stream ID "110x xxxx" (x=0 or 1). In this case also, the sub stream ID is not given. On the contrary, MPEG private stream is identified by the stream ID "1011 1101". In this case, the sub stream ID is given.

The data structure constructed on the optical disc 100 discussed with reference to FIG. 15 to FIG. 21 is summed up as shown in FIG. 22.

That is, in FIG. 22, the optical disc 100 has a data structure in which three titles are constructed by three TS objects (#1-#3) and two PS object (#4 and #5). Particularly, on the optical disc 100, the "program 1" dual-broadcasted is logically re-constructed as a multi-vision type title (i.e. a type that the user can freely switches to see) similar to an "angle switching" in DVDs. In this switching, the audio stream such as "Audio 1" of TS #1 object and "Audio 6" of TS #2 object are not used, and the elementary stream of the "program 2" is not used for this title.

Incidentally, the video stream and the like constructed by the PS object can be united by AU and PU unit to form a multi-vision type title, similarly to the case of TS object.

Particularly in this specific example, title #1 consists of both the TS object and the PS object on the same optical disc 100, title #2 consists of only the TS object, and title #3 consists of only the PS objects. The optical disc 100 having the data structure such that can be subjected to the recording and reproduction by the information record and reproduction apparatus mentioned above, without a special conscious of the user whether each object is recorded in the transport stream or recorded in the program stream. This is practically very convenience.

(Specific Structure of Each Information File in First Specific Example)

Next, with reference to FIG. 23 to FIG. 27, various information files constructed on the optical disc 100 of the aforementioned first specific example, i.e. (1) the disc information file 110, (2) the playlist information file 120 and (3) the object information file 130, which are discussed with reference to FIG. 3, will be discussed, focusing on their data structures.

(1) Disc Information File

Figure 23:
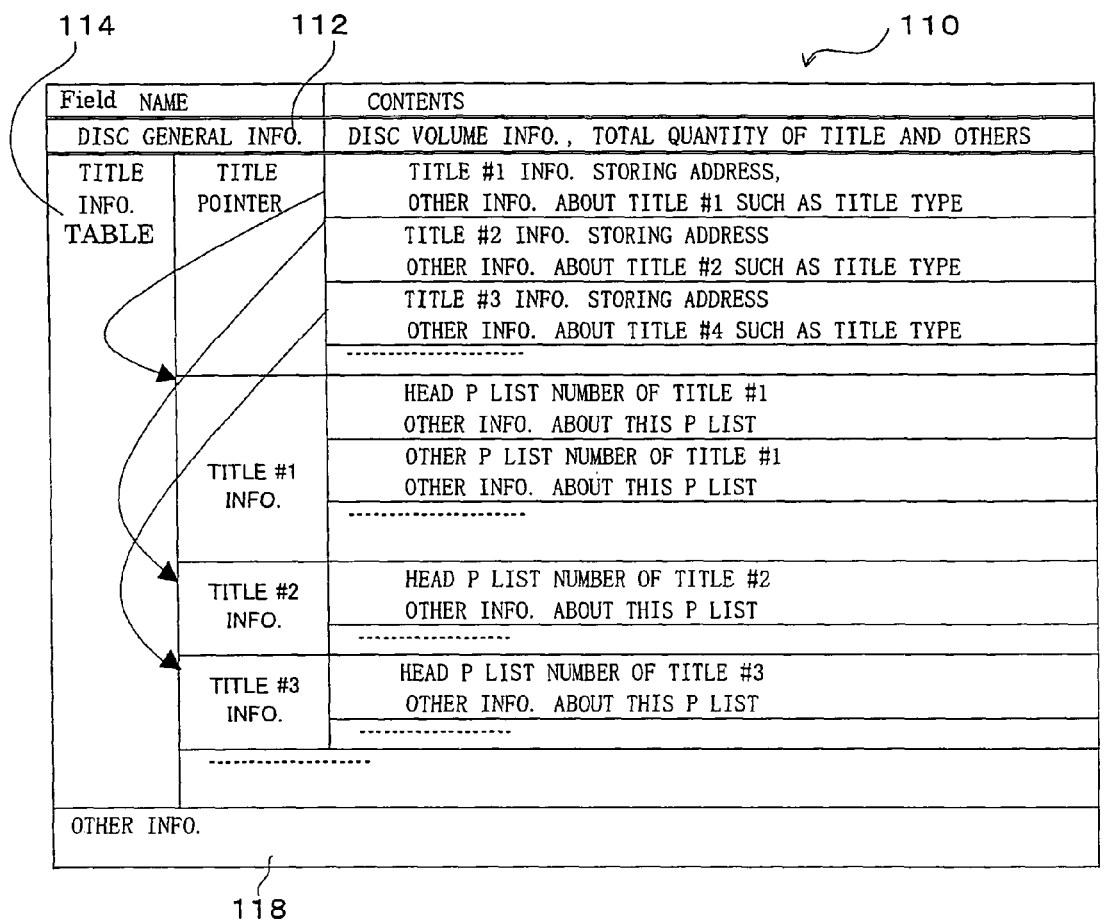
FIG. 23 is a schematic diagram illustrating a specific example of the data structure of the disc information file, in a specific example in the embodiment.

Firstly, with reference to FIG. 23, the disc information file 110 will be explained in detail with a specific example. FIG. 23 schematically illustrates a specific example of the data structure of the disc information file 110.

In this specific example as shown in FIG. 23, the disc information file 110 stores the disc general information 112, the title information table 114 and other information 118.

Among them, the disc general information 112 is general information such as total title quantity information and/or disc volume information, indicating a serial number of a series of contents that may consist of a plurality of optical discs 100.

The title information table 114 stores the entire playlist/playlists constructing each title. The title information table 114 further stores other information such as in-title chapter information as information for each title. The title information table 114 includes title pointer information, title #1 information, title #2 information, etc. The "title pointer information" is storing address information of title #n, i.e. the storing address information indicating a storing position of title #n in the title information table, in which the relationships are indicated by arrows. The title pointer information is recorded by a relative logical address. The title pointer information whose quantity corresponds to the quantity of titles in the optical disc 100 are listed as the relative logical address in the order of titles. Incidentally, data amount of each storing address information may be fixed byte, or may be variable byte.

On the other hand, other information 118 is information about each title, such as a quantity of general playlist and/or title type such as sequential type or branch type.

(2) Playlist Information File

Next, with reference to FIG. 24, the playlist information file 120 will be explained in detail, with a specific example. FIG. 24 schematically illustrates the data structure of the playlist information table 121 constructed in the playlist information file 120.

In this specific example as shown in FIG. 24, the playlist information file 120 stores, for each field, the playlist general information 122, the playlist pointer table 124, the playlist #1 information table and the playlist #2 information table 126, as the playlist information table 121 (see FIG. 3).

Each field may have a structure capable of adding tables as many as required. For example, if there are four playlists, each field may have a structure to increase the field to four. The same can be said to the item information table 129.

The playlist table size and other information such as the total quantity of playlist are recorded in the playlist general information (P list general information) 122 among them.

The playlist pointer table (P list pointer table) 124 stores record position addresses of individual playlists as relative logical addresses in the playlist information table 121. Its relationships are shown by arrows in FIG. 24.

The playlist #1 information table (P list #1 information table) 126 stores the general information about playlist #1, the item information table of playlist #1 (P list item information table) 129 and other information. The same types of information about playlist #2 are recorded also in the playlist #2 information table 126.

The "item information table" 129 stores item information for all items constructing one program. The AU number in the AU (Associate Unit) table that is recorded in the "item #1 information" or the "item #2 information" is a number of the AU that stores information to identify an address of the TS object to be used for the item reproduction and/or each elementary stream (i.e. video stream, audio stream or sub picture stream) in the TS object to be used for the item reproduction.

(3) Object Information File

Next, with reference to FIG. 25 to FIG. 27, the object information file 130 will be explained in detail, with a specific example. FIG. 25 schematically illustrates a specific example of the data structure of the object information table 131 (see FIG. 3) constructed in the object information file 130. FIG. 26 schematically illustrates a specific example of the data structure of the ES map table (#1) 134-1 for TS objects #1-#3 (see FIG. 15 to FIG. 19) constructed in the object information file 130 and associated with the object information table 131 in FIG. 25, i.e. an exemplary ES map table 134 shown in FIG. 3. FIG. 27 schematically illustrates a specific example of the data structure of the ES map table (#2) 134-2 for PS objects #4 and #5 (see FIG. 20 and FIG. 21) constructed in the object information file 130 and associated with the object information table 131 in FIG. 25, i.e. another exemplary ES map table 134 shown in FIG. 3.

In this specific example as shown in FIG. 25, the AU table 137 is constructed as a part of the object information table 131, in the object information file 130.

In FIG. 25, the AU table 137 may have a structure of each field capable of adding tables as many as required. For example, if there are four AUs, each field may have a structure to increase the fields to four.

The AU table 137 stores the "AU table general information", in which quantity of AU and pointers to individual AUs and so on are recorded, the "packet number discrete information" and "other information" in another field.

The index number of the corresponding ES map table 134 (index number= . . . ) is recorded as the AU information 138I indicating the ES table index #1 in each PU #m corresponding to each AU #n, in the AU table 137. The "AU" is a unit corresponding to a program in TV broadcasting as mentioned above (particularly, a unit made of a plurality of united switchable "visions" in multi-vision broadcasting), in which one or more PUs as reproduction units are included. The "PU" is a set of elementary streams included in each AU as mentioned above and switchable to each other. The PU information 302I identifies the ES table index # corresponding to each PU. For example, in the case that multi-view contents consists of AU, a plurality of PUs are stored in the AU, and pointers to a plurality of elementary stream packet IDs indicating packets constructing each view contents are stored in each PU. This indicates an index number in the ES map table mentioned below.

Particularly in this embodiment, the object general information in the object information table 131 includes the information 601 indicating total quantity of object information, each object type (i.e. TS object, PS object, still picture object), pointers to each object information and so on.

In this embodiment discrete information 602, which indicates a number of the packet being discrete state in a case that a packet drop out occurs in a packet serial number in the aforementioned TS object 142 during the editings, is added to the object information 133. By using the discrete information, the packet number can be counted taking into account the discrete state indicated by the discrete information (starting from the packet designated by the elementary stream) and thereby the packet address to be accessed can be identified, even if the packet number is not newly added when the packet drop out occurs. For example, the discrete information includes a start point of the discrete state and the quantity of the packet/packets dropped out. Thus, only one discrete information is recorded commonly for a plurality of AUs, which is very advantageous in view of storage capacity saving. Incidentally, such discrete information may be recorded inside or outside of the object information file other than the AU table 137. Furthermore, not only for the TS object 142 but also for the PS object, the address can be identified by the discrete information 602.

In this specific example as shown in FIG. 26, the ES map table (#1) 134-1 corresponding to the TS object #1-#3 is constructed as another part of the object information table, in the object information file 130.

In FIG. 26, the ES map table 134-1 stores, for each fields, the ES map table general information, a plurality of indexes #L (L=1, 2, . . . ) and "other information".

In the "ES map table general information", the ES map table size, total quantity of index and so on are recorded.

Each of the "Index #L" includes the elementary stream packet ID (ES_PID) and the address information of the elementary stream, which is used for the reproduction, and so on.

In this embodiment, if the elementary stream is a MPEG2 video stream for example, the TS packet number at the head of the I picture and the corresponding display time are only recorded in the ES map table 134 as the ES address information 134d. This can reduce the data amount.

Constructed as such, as for the TS object, the elementary stream packet ID (ES_PID) of the actual elementary stream can be obtained from the index number of the ES map 134-1 designated by the AU table 137. Furthermore, since the address information of the elementary stream corresponding to the elementary stream packet ID can be obtained at the same time, the object data can be reproduced on the basis of these information.

In this specific example as shown in FIG. 27, the ES map table (#2) 134-2 corresponding to the PS object #4 and #5 is constructed as another part of the object information table, in the object information file 130.

In FIG. 27, the ES map table 134-2 stores, for each field, the ES map table general information, a plurality of indexes #L (L=1, 2, . . . ), the "address information" and "other information".

Total quantity of the index, pointers to each access unit address information and so on, are recorded in the "ES map table general information".

Each of the "Index #L" includes the stream ID 603 and the sub stream ID 604, each of which is to be used for the reproduction, and the access unit address information 605 corresponding to it.

Constructed as such, as for the PS object, the stream to be reproduced can be distinguished from other streams by the stream ID and the sub stream ID from the index number of the ES map table 134-2 designated by the AU table 137. Furthermore, the address of the access unit relating to the to-be-reproduced stream can be obtained. Thereby, the object data can be reproduced on the basis of these information.

Incidentally, the address information of the access unit shown in FIG. 27 is sufficient for the access, even if it is not recorded for each stream. And the address information of the access unit is preferably recorded for each program and used commonly among a plurality of streams constructing the program. This can reduce the data amount of the address information. However, as for the sub picture stream, the address information of the access unit may be recorded for each stream. Thereby, one sub picture data can be used among a plurality of access units.

Additionally, in this specific example, the object information 133 can be recorded for each object such as the TS object and the PS object and the "packet length" can be recorded for each object (see FIG. 25) so that the control based on the AU and PU (i.e. the reproduction control using the AU and PU explained focusing on the TS object as mentioned above) is performed in the same manner for both a TS object application and a PS object application. For example, a program made of one PS object can be used as one title #3 like as the PS object #5 shown in FIG. 22. Furthermore, the TS object and the PS object can be combined and then used in one title like as title #1 shown in FIG. 22.

According to the data structure of the optical disc 100 mentioned above, it is advantageous that the required information can be simply added, even if a new title is required to be added to the optical disc 100. On the contrary, even if certain information is no longer required as the result of the editings, it is no need to delete the certain information from the table insofar as the information is not simply referred to. This is advantageous.

Incidentally, in FIG. 26, the ES_PID that is not referred from the AU table 137 in FIG. 25 is also recorded for each index of the ES map table 134-1. Nevertheless, the ES_PID that is not referred from the AU table 137 does not need to be recorded as such. However, by recording the ES_PID that is not referred from the AU table 137 and preparing the ES map table 134-1 for more flexible application, it is advantageous that the ES map table does not need to be re-constructed to re-edit the contents, for example, in the case of re-doing the authoring.

Furthermore, in this specific example, the TS objects #1-#3 are united and the corresponding ES map table 134-1 and the corresponding object information 133-1 are constructed, on the other hand, the PS objects #4 and #5 are united and the corresponding ES map table 134-2 and the corresponding object information 133-2 are constructed. Nevertheless, the ES map table 134 and the object information 133 may be constructed for each of the TS objects #1-#3 or each of the PS objects #4 and #5.

(Second Specific Example of Data Structure Recorded onto Optical Disc)

Next, with reference to FIG. 28 and FIG. 29, the second specific example of the data structure on the optical disc 100 onto which the TS object of the transport stream and the PS object of the program stream are recorded.

In this specific example, an explanation will be made on the case that three titles are prepared for six objects, i.e. three TS objects #1, #2 and #3 and two PS objects #4 and #5 in the aforementioned first specific example, and further the still picture object #6 shown in FIG. 28. FIG. 28 schematically illustrates the data structure of the still picture object #6 including the still picture data in this specific example. Furthermore, FIG. 29 schematically illustrates the data structure finally constructed on the optical disc 100.

Firstly as shown in FIG. 28, the still picture object #6 consists of three still picture data in JPEG format, bitmap format, and the like.

As shown in FIG. 29, this object #6 is added to title #2. Thereby, for example, the slide show reproduction can be started, after the reproduction of the TS object constructing item #1 of title #2. However, an independent title may consist of such an object #6.

(Specific Structure of Each Information File in Second Specific Example)

Next, with reference to FIG. 30 to FIG. 32, an explanation will be made to data structures of various information file constructed on the optical disc 100 in the aforementioned second specific example, i.e. (1) the disc information file 110, (2) the playlist information file 120 and (3) the object information file 130, which are explained with reference to FIG. 3.

(1) Disc Information File

The disc information file is the same as that of the first specific example explained with reference to FIG. 23. However, information indicating an object type may be recorded in the disc information file so that the still picture object is indicated as the still picture data.

(2) Playlist Information File

Next, with reference to FIG. 30, the playlist information file 120 will be explained in detail with a specific example. FIG. 30 schematically illustrates a specific example of the data structure of the playlist information table 121 constructed in the playlist information file 120.

In this specific example as shown in FIG. 30, different from the first specific example shown in FIG. 24, item #2 information is added to the item information table in the first playlist #2 information table. This item #2 information is about the still picture object, in which the object number, the AU number, and in particular the still picture display time information 600 are recorded. That is, when the item is reproduced, the still picture data is displayed for a time period indicated by this still picture display time information 600. Other configurations are the same those of the first specific example shown in FIG. 24.

(3) Object Information File

Next, with reference to FIG. 31 and FIG. 32, the object information file 130 will be explained in detail with a specific example. FIG. 31 schematically illustrates a specific example of the data structure of the AU table 137 (see FIG. 3) constructed in the object information file 130. FIG. 32 schematically illustrates a specific example of the data structure of the ES map table (#3) 134-3 for still picture object #6 (see FIG. 28) constructed in the object information file 130 and associated with the AU table 137 in FIG. 31, i.e. an exemplary ES map table 134 shown in FIG. 3.

In this specific example as shown in FIG. 31, the AU table 137 is constructed as a part of the object information table, in the object file 130. In this specific example, different from the fist specific example, object #3 for the still picture is added. Furthermore, the information 601 indicating an object type which means that the still picture object corresponds to object #3 is recorded in the object general information. Other configurations are the same as those of the first specific example.

In this specific example as shown in FIG. 32, the ES map table (#3) 134-3 is constructed in addition to the ES map tables 134-1 and 134-2 shown in FIGS. 26 and 27, in the object information file 130. In this specific example, the information indicating the data format, the data length, the address information, and so on are recorded in the ES map table 134-3 for each index, i.e. for each still picture (see FIG. 28). In this case, during the reproduction, the still picture data of index #1-#3 are sequentially reproduced according to the still picture display time information 600 shown in FIG. 30.

As explained in detail with reference to FIG. 1 to FIG. 32, according to this embodiment, a plurality of programs can be multi-recorded onto the same optical disc 100, regardless of whether the programs are TS objects, PS objects or still picture objects. And further a desired program can be selected and reproduced during the reproduction. Furthermore, such a plurality of programs can be switched to each other quickly.

Incidentally, in the aforementioned embodiment, the explanation is made to the optical disc 100 as an example of the information record medium and the recorder or player of the optical disc 100 as an example of the information record and reproduction apparatus. Nevertheless, the present invention is not limited to the optical disc and the player or recorder thereof, but is applicable to various information record medium and the recorder or player thereof, supporting other high density recording or high transfer rate.

As discussed, according to the present invention, it is possible to perform, by a relatively simple manner, a relatively complicated recording and reproduction in which one or more programs are multi-recorded as a plurality of streams conforming to the MPEG2 program stream or transport stream, for example.

The present invention is not limited to the above-described embodiments, and various changes may be made, if desired, without departing from the scope or spirit of the invention which can be read from the claims and the entire specification. An information recording medium, an apparatus for and a method of recording the information, an apparatus for and a method of reproducing the information, an apparatus for and a method of recording and reproducing the information, a computer program for controlling the record or the reproduction, and a data structure including a control signal that accompany such changes are also intended to be within the technical scope of the present invention.

INDUSTRIAL APPLICABILITY

An information recording medium, a apparatus for and a method of recording the information, an apparatus for and a method of reproducing the information, an apparatus for and a method of recording and reproducing the information, a computer program for controlling the record or the reproduction, and a data structure including a control signal that are associated with the present invention can be applied to a high-density optical disc for consumer or industrial use, such as a DVD, on which various information, such as the video information, the audio information, the sub-picture information, and the reproduction control information, can be recorded at high density and further can be applied to a DVD player, a DVD recorder, and the like. Moreover, they can be applied to an information recording medium, an information record and reproduction apparatus, or the like, which are inserted in or can be connected to various computer equipment for consumer or industrial use, for example.

The invention claimed is:

1. A non-transitory computer-readable information record medium onto which a title, which is constructed from a plurality of video streams and a plurality of audio streams, is recorded, wherein each of the plurality of video streams is a partial stream constructing video information which is multi-recorded by a unit of a packet such that the video information can be recorded by an information recording apparatus or can be reproduced by an information reproducing apparatus, and each of the plurality of audio streams is a partial stream constructing audio information which is multi-recorded by the unit of the packet such that the audio information can be recorded by the information recording apparatus or can be reproduced by the information reproducing apparatus, said information record medium comprising:

an object data file for storing object data comprising the title which includes a plurality of switchable parallel streams which can be reproduced so as to be switched and a sequential stream which can be reproduced sequentially, wherein the plurality of switchable parallel streams include a plurality of partial streams which are constructed from the video stream including a plurality of packets each of which stores a piece of the video information and the audio stream including a plurality of packets each of which stores a piece of the audio information, and the sequential stream includes a plurality of partial streams which are constructed from the video stream including the plurality of packets each of which stores the piece of the video information and the audio stream including the plurality of packets each of which stores the piece of the audio information; and reproduction control information for controlling a reproduction of the object data, wherein the reproduction control information includes:

a reproduction sequence file, and an object information file and association group definition information, the reproduction sequence file stores play list information which includes first item information and second item information, the first item information defines a reproduction sequence of the sequential stream, which constructs a part of one title, by a unit of an item arranged on a time axis, the second item information defines a reproduction sequence of the plurality of switchable parallel streams, which constructs other part of the one title, by the unit of the item, the object information file stores first partial stream packet identification information and second partial stream packet identification information and first address information and second address information, the first partial stream packet identification information identifies an ID of a packet which belongs to one partial stream belonging to one sequential stream from among the plurality of partial streams which are defined by one first item information, the second partial stream packet identification information identifies an ID of a packet which belongs to one partial stream belonging to one switchable parallel stream from among the plurality of partial streams which are defined by one second item information, the first address information identifies an address of the one partial stream belonging to the one sequential stream from among the plurality of partial streams which are defined by the one first item information, and the second address information identifies an address of the one partial stream belonging to the one switchable parallel stream from among the plurality of partial streams which are defined by the one second item information, the association group definition information defines, as an association group, a plurality of partial streams which are defined by the one first item information or the one second item information, from among the object data which construct the plurality of partial streams constructing the one title, the object data includes a part packetized in a first encoding format and another part packetized in a second encoding format, the object information file further stores classification information for indicating whether the object data is a first object data conforming to the first encoding format or a second object data conforming to the second encoding format, each of the object data file, the object information file, and the play list information file is recorded into a different area as a different file which is a unit recognized by a file system, respectively, the information reproducing apparatus reproduces some of the sequential streams constructing a desired title, from among the plurality of partial streams which are constructed from the plurality of packets, by the object information specified by the first play item information belonging to the play list information extracted by the information reproducing apparatus, the information reproducing apparatus reproduces a desired switchable parallel stream, which is specified by a switching instruction from the information reproducing apparatus, constructing the desired title, from among the plurality of partial streams which are constructed from the plurality of packets, by the object information specified by the second play item information belonging to the play list information extracted by the information reproducing apparatus, the object data file is packetized by a unit of the packet, the object information file is not packetized.

2. The non-transitory computer-readable information record medium according to claim 1, wherein the part of the object data packetized in the first encoding format is a MPEG transport stream (TS), and the another part of the object data packetized in the second encoding format is a MPEG program stream (PS).

3. The non-transitory computer-readable information record medium according to claim 1, wherein the object data file stores still picture information as at least a part of the video information, the object information file further stores address information for indicating a record position of the still picture information, data length information for indicating a data length of the still picture information, and data format information for indicating a data format of the still picture information as for the still picture information.

4. An information reproduction apparatus for reproducing the title from the computer-readable information record medium according to claim 1, said information reproduction apparatus comprising:

a read device for physically reading information from the information record medium; and a reproduction device for reproducing the object data included in the information read by the read device, on the basis of the reproduction control information included in the information read by the read device.

5. The information reproduction apparatus according to claim 4, wherein the object data file stores still picture information, as at least a part of the video information, and the reproduction device switches a reproduction processing so that a decoder conforming to the still picture information performs decoding when the still picture information is reproduced.

6. A non-transitory computer-readable recording medium encoded with a computer program for a reproduction control to control a computer disposed at the information reproduction apparatus according to claim 4, said computer program makes the computer function as at least a part of the read device and the reproduction device.

7. An information reproduction method of reproducing the title from the computer-readable information record medium according to claim 1, said information reproduction method comprising:
a read process of physically reading information from the information record medium; and
a reproduction process of reproducing the object data included in the information read at the read process, on the basis of the reproduction control information included in the information read at the read process.

8. An information record apparatus for multi-recording a title, which is constructed from a plurality of video streams and a plurality of audio streams, onto an information recording medium, wherein each of the plurality of video streams is a partial stream constructing video information which is multi-recorded by a unit of a packet such that the video information can be recorded by the information recording apparatus or can be reproduced by an information reproducing apparatus, and each of the plurality of audio streams is a partial stream constructing audio information which is multi-recorded by the unit of the packet such that the audio information can be recorded by the information recording apparatus or can be reproduced by the information reproducing apparatus, said information record apparatus comprising:
a first record device for recording an object data file for storing object data comprising the title which includes a plurality of switchable parallel streams which can be reproduced so as to be switched and a sequential stream which can be reproduced sequentially, wherein the plurality of switchable parallel streams include a plurality of partial streams which are constructed from the video stream including a plurality of packets each of which stores a piece of the video information and the audio stream including a plurality of packets each of which stores a piece of the audio information, and the sequential stream includes a plurality of partial streams which are constructed from the video stream including the plurality of packets each of which stores the piece of the video information and the audio stream including the plurality of packets each of which stores the piece of the audio information; and
a second record device for recording reproduction control information for controlling a reproduction of the object data, wherein
the reproduction control information includes:
a reproduction sequence file,
an object information file and association group definition information,
the reproduction sequence file stores play list information which includes first item information and second item information, the first item information defines a reproduction sequence of the sequential stream, which constructs a part of one title, by a unit of an item arranged on a time axis, the second item information defines a reproduction sequence of the plurality of switchable parallel streams, which constructs other part of the one title, by the unit of the item,
the object information file stores first partial stream packet identification information and second partial stream packet identification information and first address information and second address information, the first partial stream packet identification information identifies an ID of a packet which belongs to one partial stream belonging to one sequential stream from among the plurality of partial streams which are defined by one first item information, the second partial stream packet identification information identifies an ID of a packet which belongs to one partial stream belonging to one switchable parallel stream from among the plurality of partial streams which are defined by one second item information, the first address information identifies an address of the one partial stream belonging to the one sequential stream from among the plurality of partial streams which are defined by the one first item information, and the second address information identifies an address of the one partial stream belonging to the one switchable parallel stream from among the plurality of partial streams which are defined by the one second item information,
the association group definition information defines, as an association group, a plurality of partial streams which are defined by the one first item information or the one second item information, from among the object data which construct the plurality of partial streams constructing the one title,
the object data includes a part packetized in a first encoding format and another part packetized in a second encoding format,
the object information file further stores classification information for indicating whether the object data is a first object data conforming to the first encoding format or a second object data conforming to the second encoding format,
each of the object data file, the object information file, and the play list information file is recorded into a different area as a different file which is a unit recognized by a file system, respectively,
the information reproducing apparatus reproduces some of the sequential streams constructing a desired title, from among the plurality of partial streams which are constructed from the plurality of packets, by the object information specified by the first play item information belonging to the play list information extracted by the information reproducing apparatus,
the information reproducing apparatus reproduces a desired switchable parallel stream, which is specified by a switching instruction from the information reproducing apparatus, constructing the desired title, from among the plurality of partial streams which are constructed from the plurality of packets, by the object information specified by the second play item information belonging to the play list information extracted by the information reproducing apparatus,
the object data file is packetized by a unit of the packet,
the object information file is not packetized.

9. A non-transitory computer-readable recording medium encoded with a computer program for a record control to control a computer disposed at the information record apparatus according to claim 8, said computer program makes the computer function as at least a part of the first record device and the second record device.

10. An information record method of multi-recording a title, which is constructed from a plurality of video streams and a plurality of audio streams, onto an information recording medium, wherein each of the plurality of video streams is a partial stream constructing video information which is multi-recorded by a unit of a packet such that the video information can be recorded by the information recording apparatus or can be reproduced by an information reproducing apparatus, and each of the plurality of audio streams is a partial stream constructing audio information which is multi-recorded by the unit of the packet such that the audio information can be recorded by the information recording apparatus or can be reproduced by the information reproducing apparatus, said information record method comprising:

a first record process of recording an object data file for storing object data comprising the title which includes a plurality of switchable parallel streams which can be reproduced so as to be switched and a sequential stream which can be reproduced sequentially, wherein the plurality of switchable parallel streams include a plurality of partial streams which are constructed from the video stream including a plurality of packets each of which stores a piece of the video information and the audio stream including a plurality of packets each of which stores a piece of the audio information, and the sequential stream includes a plurality of partial streams which are constructed from the video stream including the plurality of packets each of which stores the piece of the video information and the audio stream including the plurality of packets each of which stores the piece of the audio information; and a second record process of recording reproduction control information for controlling a reproduction of the object data, wherein the reproduction control information includes:

a reproduction sequence file, an object information file and association group definition information, the reproduction sequence file stores play list information which includes first item information and second item information, the first item information defines a reproduction sequence of the sequential stream, which constructs a part of one title, by a unit of an item arranged on a time axis, the second item information defines a reproduction sequence of the plurality of switchable parallel streams, which constructs other part of the one title, by the unit of the item, the object information file stores first partial stream packet identification information and second partial stream packet identification information and first address information and second address information, the first partial stream packet identification information identifies an ID of a packet which belongs to one partial stream belonging to one sequential stream from among the plurality of partial streams which are defined by one first item information, the second partial stream packet identification information identifies an ID of a packet which belongs to one partial stream belonging to one switchable parallel stream from among the plurality of partial streams which are defined by one second item information, the first address information identifies an address of the one partial stream belonging to the one sequential stream from among the plurality of partial streams which are defined by the one first item information, and the second address information identifies an address of the one partial stream belonging to the one switchable parallel stream from among the plurality of partial streams which are defined by the one second item information, the association group definition information defines, as an association group, a plurality of partial streams which are defined by the one first item information or the one second item information, from among the object data which construct the plurality of partial streams constructing the one title, the object data includes a part packetized in a first encoding format and another part packetized in a second encoding format, the object information file further stores classification information for indicating whether the object data is a first object data conforming to the first encoding format or a second object data conforming to the second encoding format, each of the object data file, the object information file, and the play list information file is recorded into a different area as a different file which is a unit recognized by a file system, respectively, the information reproducing apparatus reproduces some of the sequential streams constructing a desired title, from among the plurality of partial streams which are constructed from the plurality of packets, by the object information specified by the first play item information belonging to the play list information extracted by the information reproducing apparatus, the information reproducing apparatus reproduces a desired switchable parallel stream, which is specified by a switching instruction from the information reproducing apparatus, constructing the desired title, from among the plurality of partial streams which are constructed from the plurality of packets, by the object information specified by the second play item information belonging to the play list information extracted by the information reproducing apparatus, the object data file is packetized by a unit of the packet, the object information file is not packetized.

* * * * *